(12) United States Patent
Miura et al.

(10) Patent No.: US 6,731,810 B1
(45) Date of Patent: May 4, 2004

(54) METHOD AND APPARATUS FOR CODING MOVING IMAGE AND MEDIUM FOR RECORDING PROGRAM OF CODING MOVING IMAGE

(75) Inventors: Takashi Miura, Sapporo (JP); Fumihiko Itagaki, Sapporo (JP); Miyuki Kawashima, Sapporo (JP)

(73) Assignee: Hudson Soft Co., Ltd. (JP)

( * ) Notice: Subject to any disclaimer, the term of this patent is extended or adjusted under 35 U.S.C. 154(b) by 0 days.

(21) Appl. No.: 09/461,872

(22) Filed: Dec. 15, 1999

(30) Foreign Application Priority Data

Dec. 24, 1998 (JP) .......................................... 10-367608

(51) Int. Cl.[7] .............................. G06K 9/36; G06K 9/46
(52) U.S. Cl. ....................................... 382/236; 382/253
(58) Field of Search ................................ 382/236, 253, 382/248, 251, 238, 128, 243; 348/453.1, 699; 375/240.08

(56) References Cited

U.S. PATENT DOCUMENTS

| | | | |
|---|---|---|---|
| 5,157,743 A | * | 10/1992 | Maeda et al. ............... 382/248 |
| 5,583,963 A | * | 12/1996 | Luzach ........................ 704/219 |
| 6,154,572 A | * | 11/2000 | Chaddha ..................... 382/253 |
| 6,212,235 B1 | * | 4/2001 | Nieweglowski et al. ...................... 375/240.08 |
| 6,463,341 B1 | * | 10/2002 | Cao et al. ..................... 700/48 |

* cited by examiner

Primary Examiner—Wenpeng Chen
(74) Attorney, Agent, or Firm—Robert F. I. Conte; Barnes & Thornburg

(57) ABSTRACT

A method and an apparatus for coding a moving image, capable of obtaining high image quality and high rate of data compression, are provided. The method compares a pixel block of current image to be coded and a pixel block of preceding image within a predetermined region of preceding frame, one after another. The method seeks a specific preceding-image pixel block minimizing matching error. If the matching error relative to the specific preceding-image pixel block exceeds an acceptable value, than the method obtains one or more of orthogonal base systems for approximating AC component vector in the current-image pixel block by inter-frame adaptive orthogonal transformation having, as nest thereof, preceding image data within a predetermined region including the specific preceding-image pixel block. The method thereby codes the moving image data.

15 Claims, 16 Drawing Sheets

(A) CODING APPARATUS (B) DECODING APPARATUS

FIG.3
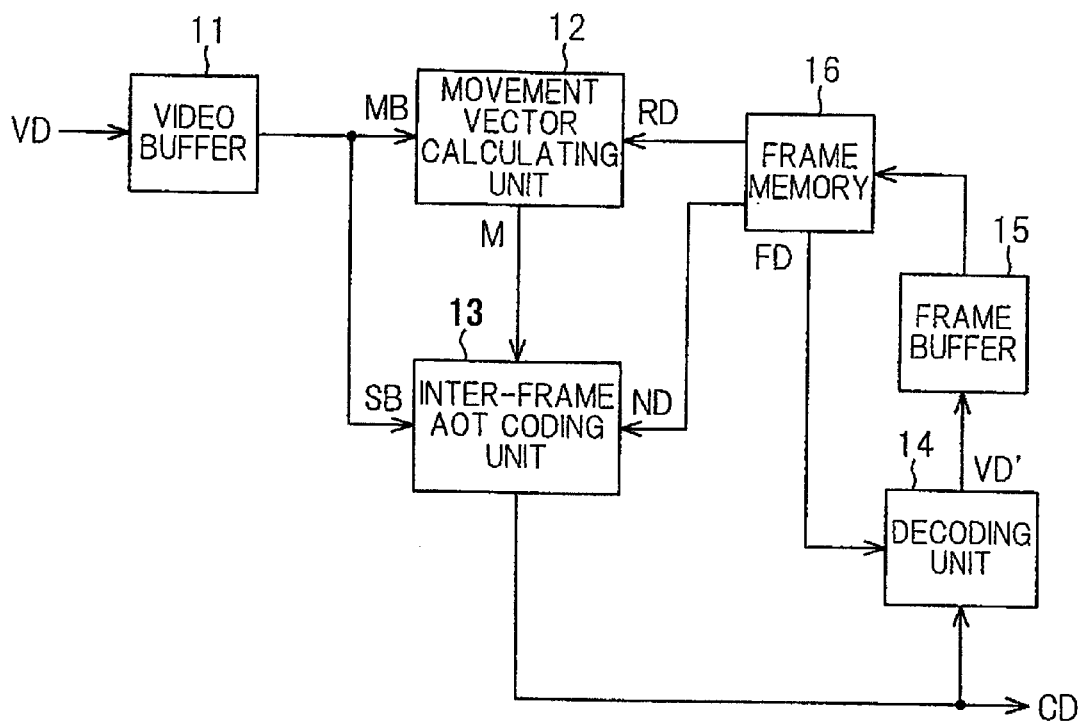
(A) CODING APPARATUS
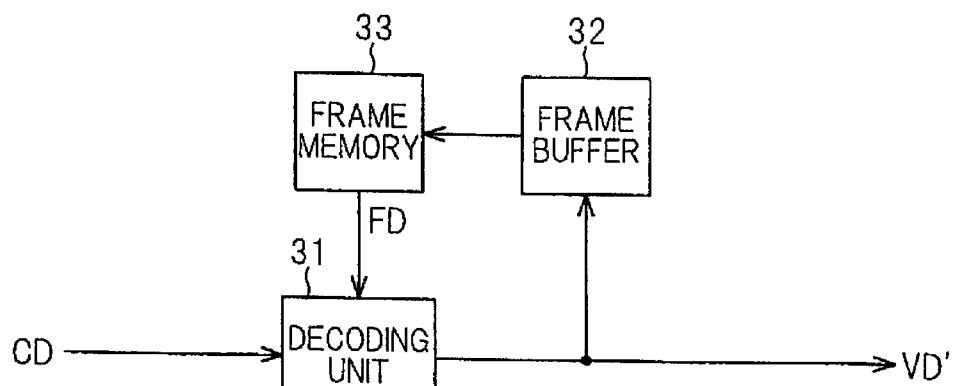
(B) DECODING APPARATUS

FLOW CHART (1) OF MOVEMENT-COMPENSATED INTER-FRAME AOT CODING ACCORDING TO AN EMBODIMENT

FLOW CHART (2) OF MOVEMENT-COMPENSATED INTER-FRAME AOT CODING ACCORDING TO AN EMBODIMENT

FLOW CHART (3) OF MOVEMENT-COMPENSATED INTER-FRAME AOT CODING ACCORDING TO AN EMBODIMENT

FLOW CHART (4) OF MOVEMENT-COMPENSATED INTER-FRAME AOT CODING ACCORDING TO AN EMBODIMENT

FLOW CHART (5) OF MOVEMENT-COMPENSATED INTER-FRAME AOT CODING ACCORDING TO AN EMBODIMENT

FLOW CHART (6) OF MOVEMENT-COMPENSATED INTER-FRAME AOT CODING ACCORDING TO AN EMBODIMENT

FLOW CHART (7) OF MOVEMENT-COMPENSATED INTER-FRAME AOT CODING ACCORDING TO AN EMBODIMENT

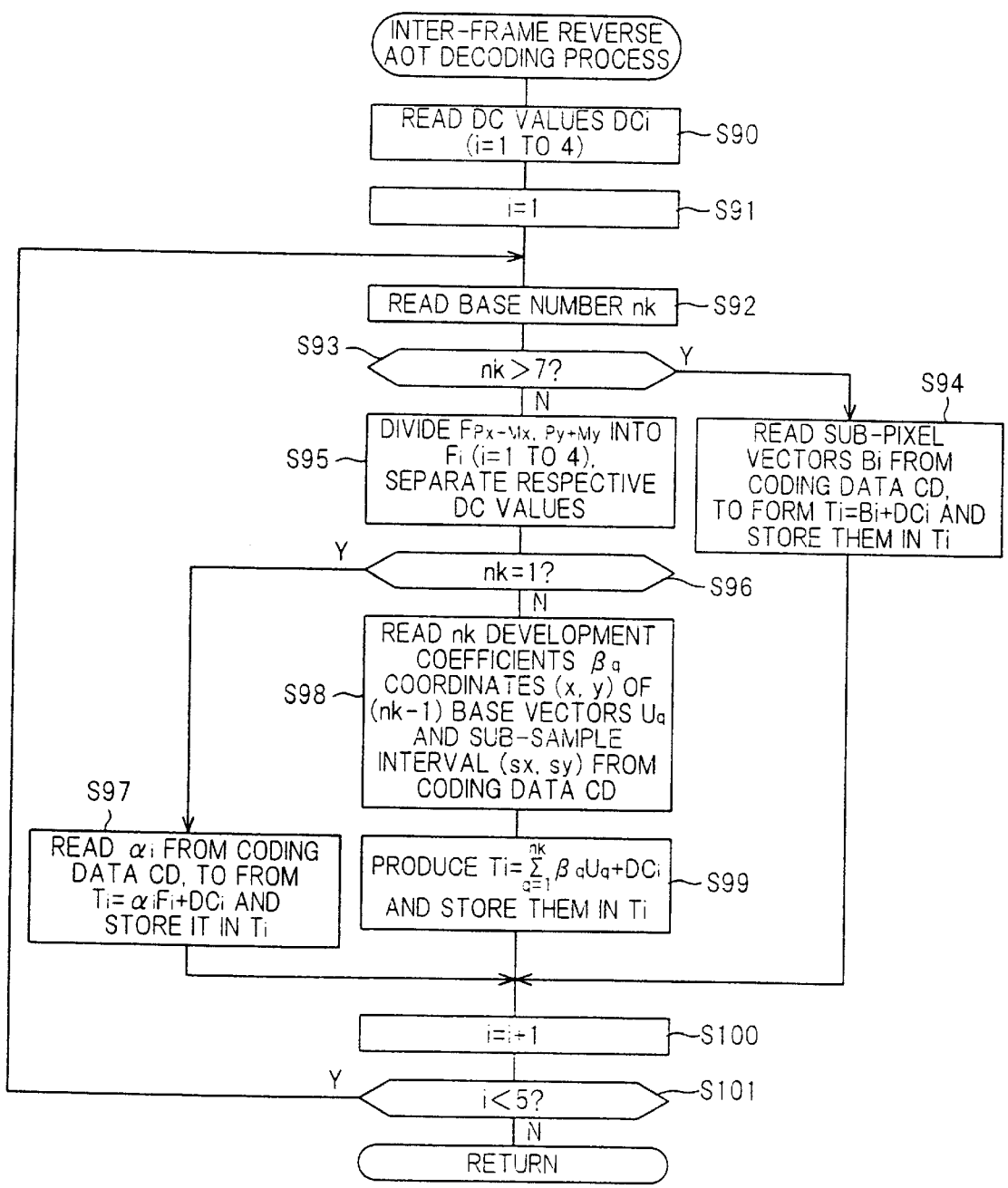

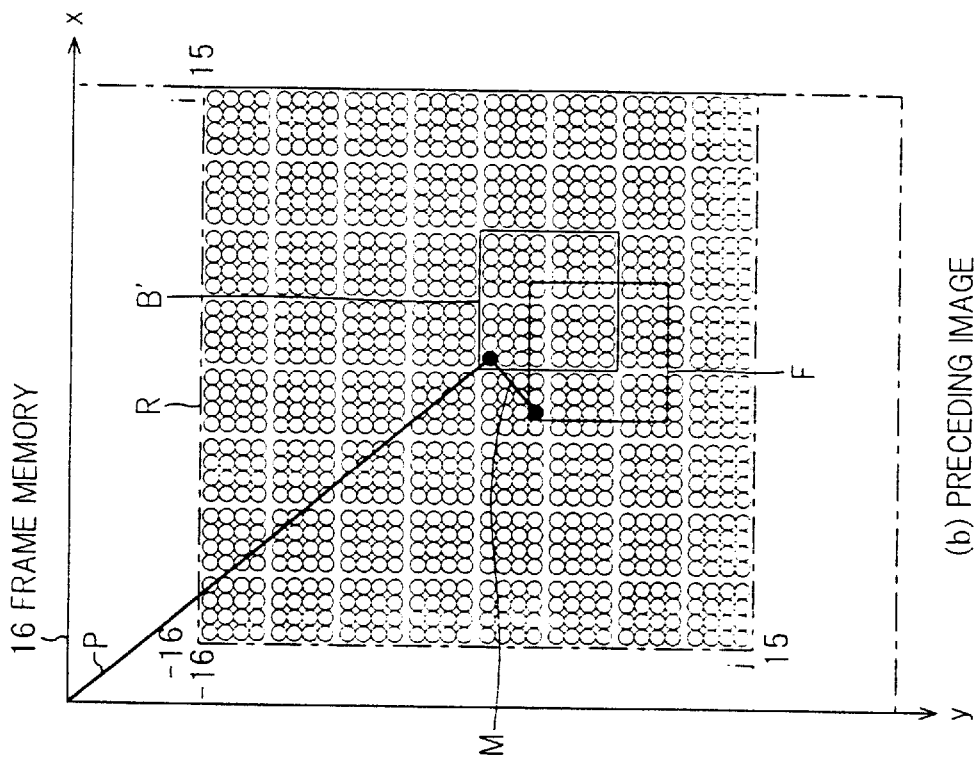
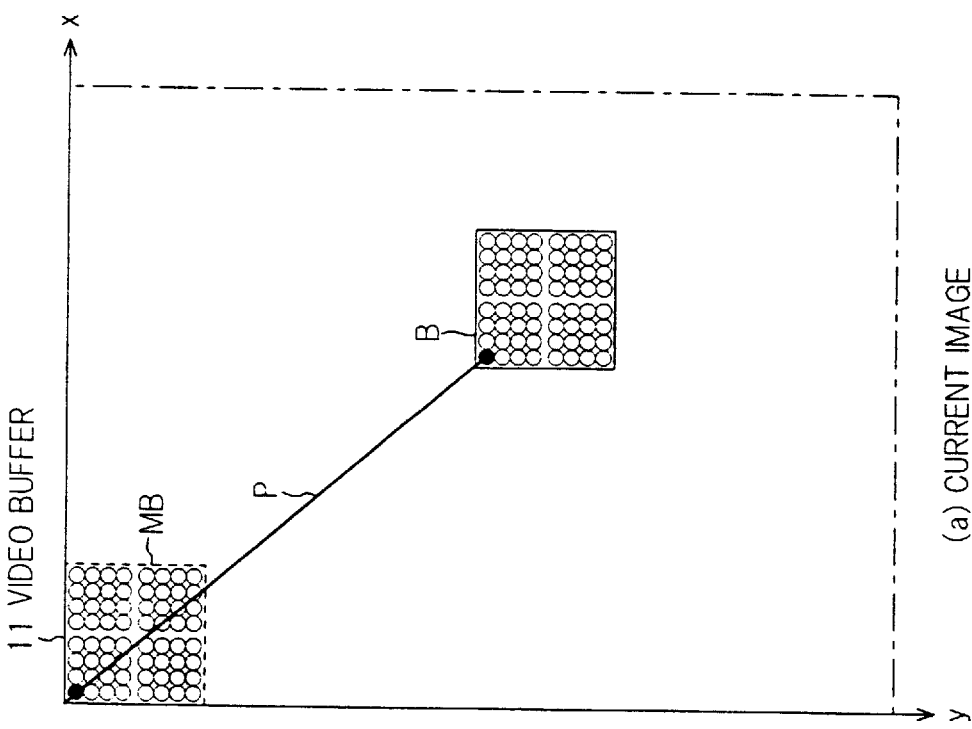
FIG.12 IMAGE ILLUSTRATION (1) OF MOVEMENT-COMPENSATED INTER-FRAME AOT CODING ACCORDING TO AN EMBODIMENT

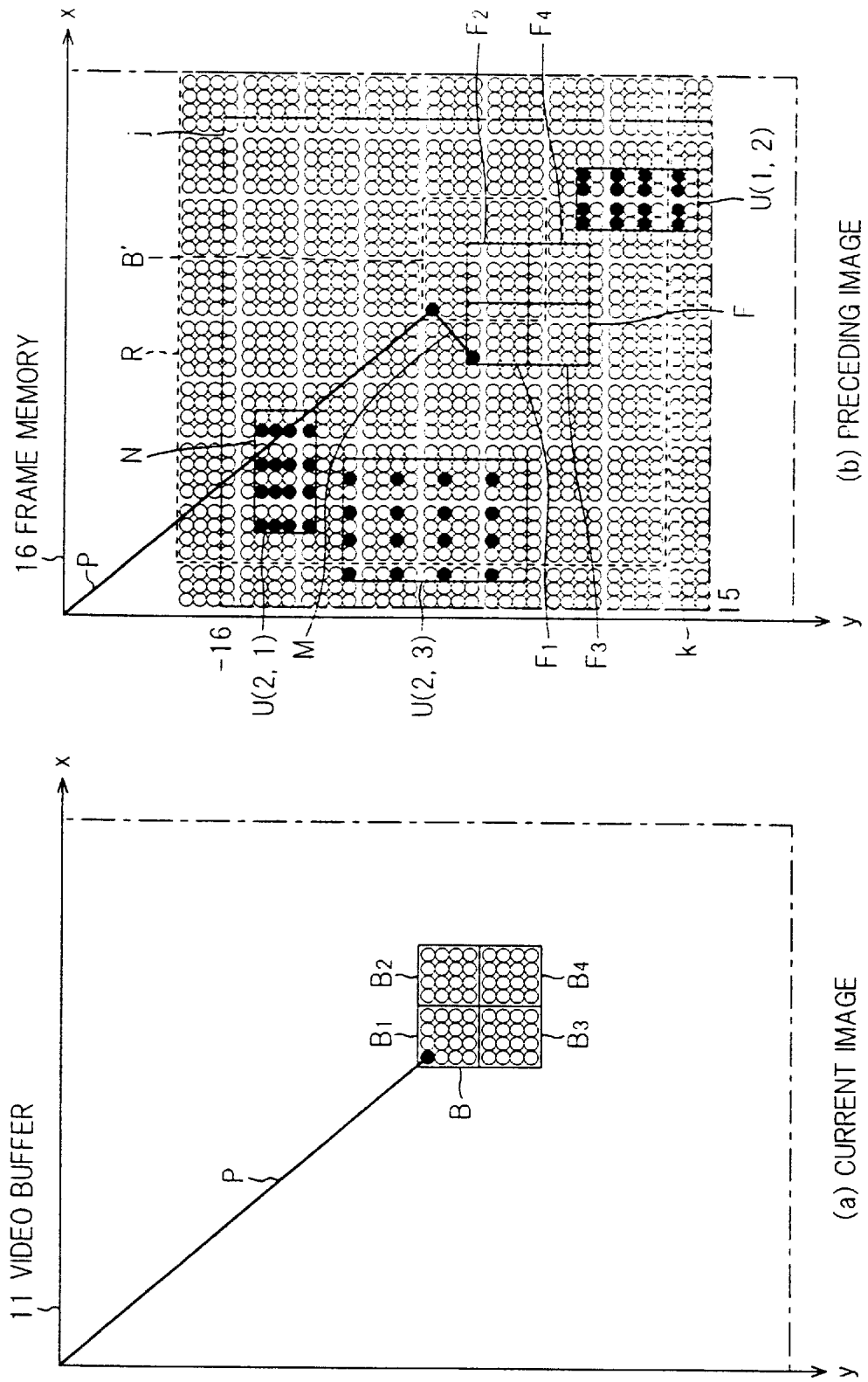

FIG. 14
IMAGE ILLUSTRATION (3) OF MOVEMENT-COMPENSATED INTER-FRAME AOT CODING ACCORDING TO AN EMBODIMENT
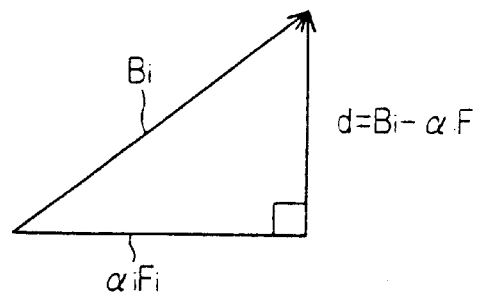
(A) OPTIMAL APPROXIMATION OF $B_i$
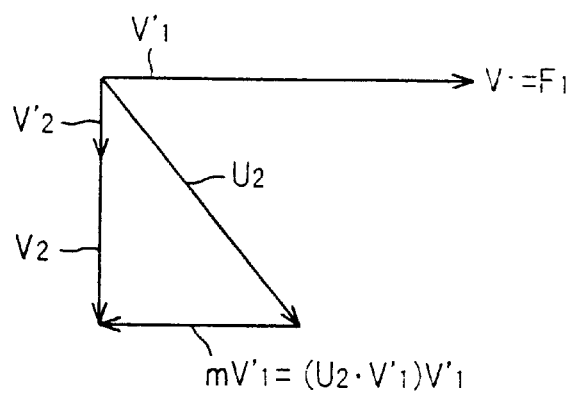
(B) ORTHOGONAL BY GRAM-SCHMIDT
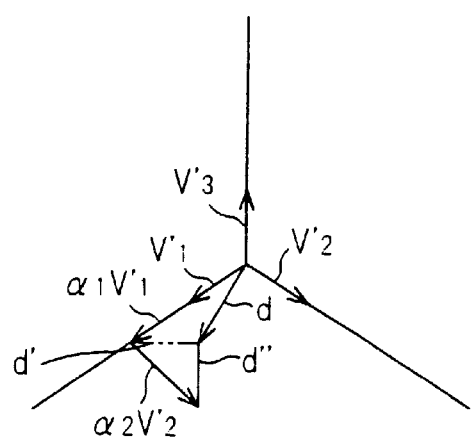
(C) APPROXIMATION OF RESIDUAL DIFFERENCE VECTOR

FIG. 15
ILLUSTRATION (1) SHOWING THE RELATION BETWEEN
THE AMOUNT OF CODE AND IMAGE QUALITY IN AN EMBODIMENT
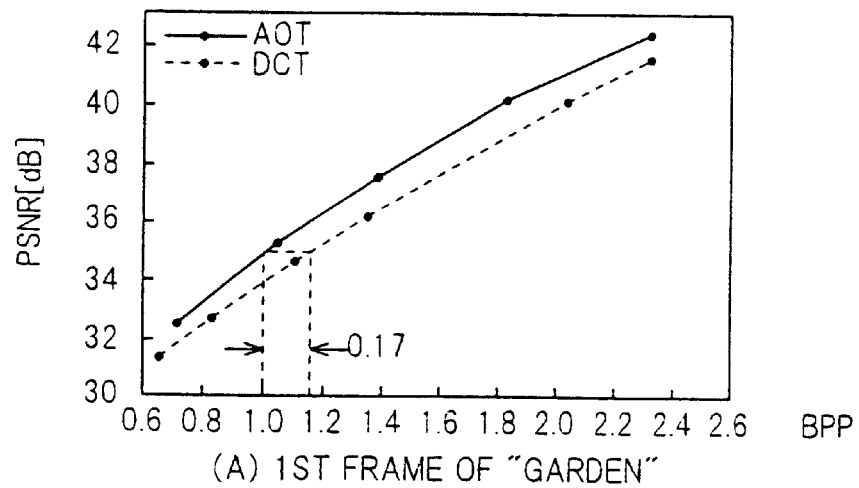
(A) 1ST FRAME OF "GARDEN"
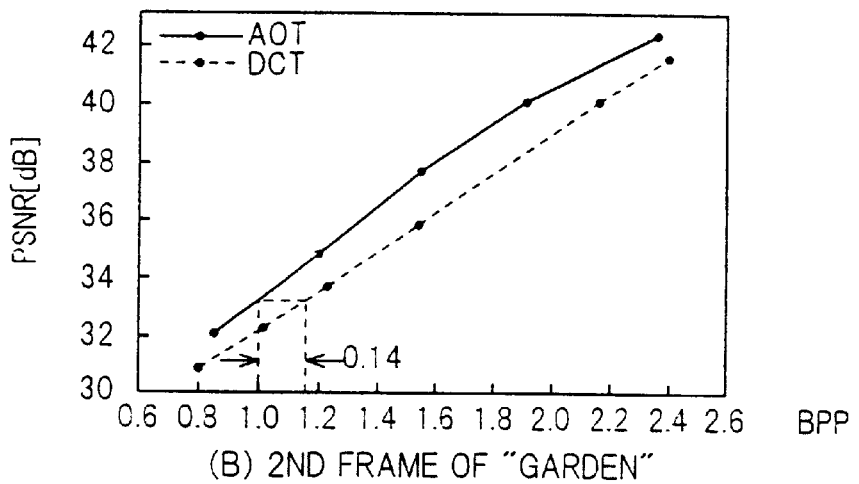
(B) 2ND FRAME OF "GARDEN"
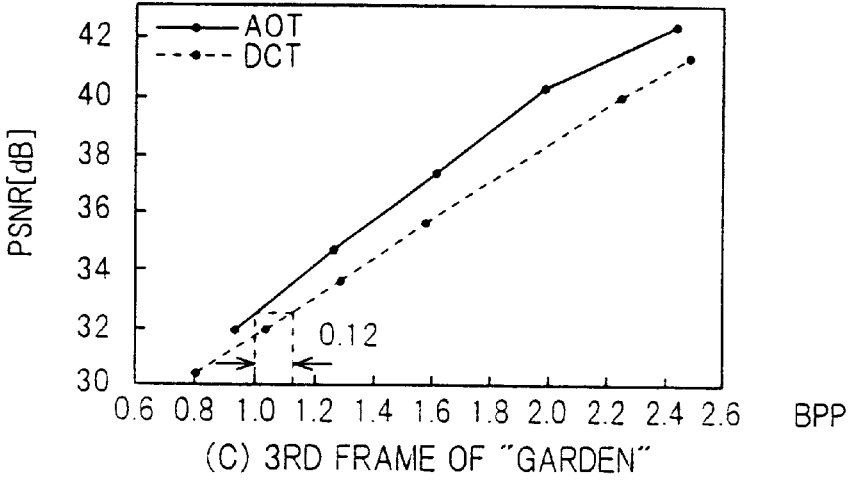
(C) 3RD FRAME OF "GARDEN"

FIG.16
ILLUSTRATION (2) SHOWING THE RELATION BETWEEN
THE AMOUNT OF CODE AND IMAGE QUALITY IN AN EMBODIMENT
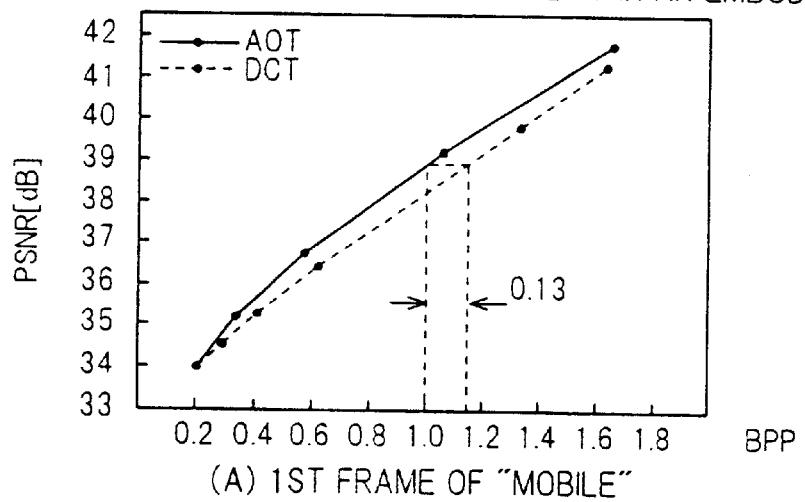
(A) 1ST FRAME OF "MOBILE"
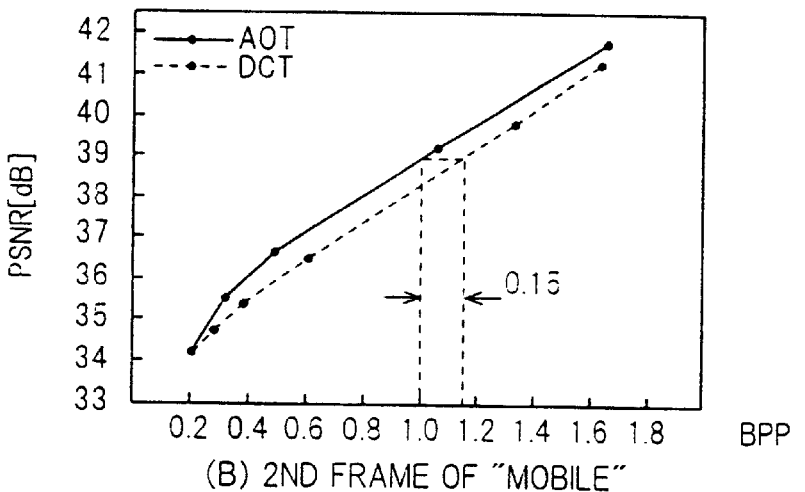
(B) 2ND FRAME OF "MOBILE"
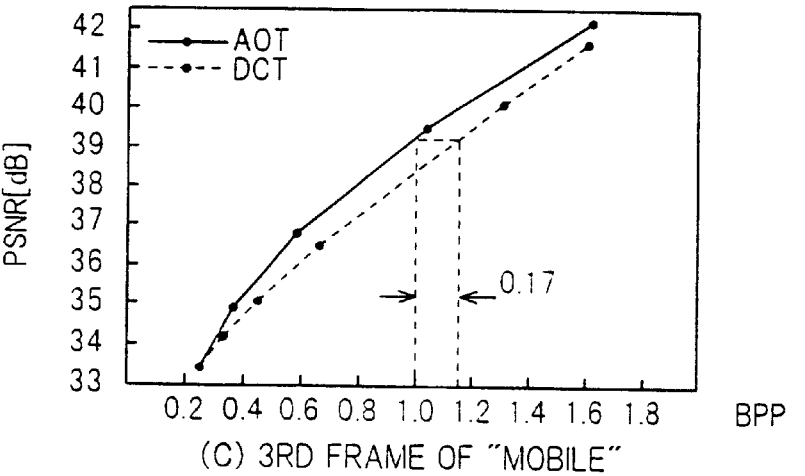
(C) 3RD FRAME OF "MOBILE"

METHOD AND APPARATUS FOR CODING MOVING IMAGE AND MEDIUM FOR RECORDING PROGRAM OF CODING MOVING IMAGE

FIELD OF THE INVENTION

The present invention relates to a method and an apparatus for coding a moving image and to a recording medium for recording a program of coding a moving image, and more particularly to a method and an apparatus for high rate compression coding of moving image data in TV, animation, color-graphic game and so on, and further, to a recording medium for recording a program of coding used for the same.

BACKGROUND OF THE INVENTION

Heretofore, a system for inter-frame coding with movement compensation (movement-compensated inter-frame coding) has been known which is capable of information-compressed coding of moving-image signals, such as in TV, at high efficiency. FIG. 1 illustrates a prior art, in which the construction of a conventional system for movement-compensated inter-frame coding is shown.

In FIG. 1, video-buffer 51 stores sequentially current image data VD inputted. Meanwhile, frame memory 57 stores preceding image data FD, of one frame earlier, reproduced through decoding. The preceding image data FD is read out for inter-frame expectation coding of current image data VD with the movement of image compensated. In more detail, movement-vector calculation unit 58 calculates the moving of the image (pixel block) between the frames by block-matching search calculation to output the optimum movement vector MV.

In an example of block-matching search calculation, assuming that pixel data of pixel block BD are $B_k$ (k=1 to 16), pixel data of i-th pixel block $RD_i$ of 8×8 pixels in search region R in frame memory 57 are $Y_{i,k}$ (k=1 to 16), differential absolute value sum Si between the both pixel blocks Si is calculated by block-matching calculation:

$$S_i = \Sigma \|B_k - Y_{i,k}\| (k=1 \text{ to } 16)$$

and then the optimum pixel block $Y_{i,k}$ that makes differential absolute value sum $S_i$ minimal is found out, thereby the optimum movement vector MV is obtained.

Meanwhile, variable delay buffer 59 serves to extract pixel block $Y_{i,k}$ corresponding to (optimum) movement vector MV from preceding image data FD to make expected block data PD for movement compensation. Further, subtracter 52 subtracts from respective pixel data VD to be coded the corresponding expected data for movement compensation PD to produce residual difference data PE. Quantumizer 53 quantumizes residual difference data PE to produce coding data CE to be transmitted.

In this state, dequantumizer 54 dequantumizes coding data CE, producing residual difference data PE'. Adder 55 adds expected data PD for movement compensation stated above to residual difference data PE', to reproduce current pixel data VD'. Frame buffer 56 accumulates in sequence current pixel data VD' thus reproduced. After the data for one frame are accumulated, the reproduced data for the one frame are transferred to frame memory 57 as image data FD for the preceding frame.

But the method above in which residual difference data PE for each pixel are quantumized cannot reduce the redundant information associated with the original image itself, thus, high rate of data compression cannot be expected. In this respect, MPEG (Moving Picture Experts Group) system which is popular among the recent systems of moving image compression has achieved a relatively high ratio of data compression by performing inter-frame expectation with movement compensation in a block of 16×16 image elements (pixels), performing two-dimensional DCT (Discrete Cosine Transform) in a unit of 8×8 pixels related to the expected residual difference thus obtained, quantumizing the sequency thus obtained and performing Haffmann coding.

The predominant portion of the expected residual difference by inter-frame expectation for movement compensation of this kind, however, tends to be concentrated to the peripheral portion of the original image block. This tendency is observed significantly particularly when the original image consists of animation image or color graphic game image containing flat portions and peripheral portions with steep gradient. Therefore, if expected residual difference is developed immediately by a system-fixed orthogonal base system (DCT) such as in conventional MPEG system above, many development coefficients (sequency) containing lower and higher frequency components are required, and a high ratio of data compression cannot be obtained. Further, if high-frequency components are quantumized with low precision in order to elevate data compression ratio, not only image information of the peripheral portions is lost, but also image quality is deteriorated by mosquito noises generated in the peripheral portions.

SUMMARY OF THE INVENTION

Accordingly, it is an object of the invention to provide a method for coding of a moving image capable of obtaining high image quality and high ratio of data compression (coding efficiency).

It is another object of the invention to provide an apparatus for coding of a moving image capable of obtaining high image quality and high coding efficiency.

It is still another object of the invention to provide a recording medium for recording a program of coding a moving image in high quality and with high efficiency.

According to the first feature of the invention, the object of the invention stated above is accomplished by a method of coding a moving image comprising the steps of:

comparing a pixel block of current image to be coded and a pixel block of preceding image within a predetermined region of preceding frame, one after another;

seeking a specific preceding-image pixel block minimizing matching error;

if said matching error relative to said specific preceding-image pixel block exceeds an acceptable value, obtaining one or more of orthogonal base systems for approximating AC component vector in said current-image pixel block by inter-frame adaptive orthogonal transformation having, as nest thereof, preceding image data within a predetermined region including said specific preceding image pixel block; and thereby coding said image data.

According to the first feature of the invention, a high image quality and a high ratio of data compression are obtained by the constitution in which current pixel block B having a matching error relative to the image data of the preceding frame exceeding an acceptable value is approximated by one or more orthogonal base systems by inter-frame adaptive orthogonal transformation utilizing the image data of the preceding frame of a moving image which enable generally to obtain a high correlation between the frames. Further, current pixel block B (alternating current component vector) can be coded with improved efficiency by a small number of orthogonal bases, owing to the constitution utilizing the preceding image data within a predetermined region N including the specific preceding pixel block F minimizing the matching error relative to the current pixel block B as the nest of inter-frame adaptive orthogonal transformation (corresponding to the code book of vector quantumization). Further, remarkable improvement of the coding efficiency (reduction in the amount of codes) can be expected with the original image quality maintained honestly, particularly when the original image consists of animation image or color graphic game image containing a lot of flat portions and peripheral portions with steep gradient.

In the invention, "preceding frame" may be a frame immediately before a current frame in the order of displaying a moving image, or a frame which is displayed after the current frame in the order of displaying the moving image, and image data of which is prepared in advance of the display of the current frame for reference of the coding in the current frame.

According to the second feature of the invention, the first basis for approximating AC component vector <B> of the current pixel block is produced based on AC component vector <F> of the specific preceding pixel block, according to the first feature of the invention.

As specific preceding pixel block F minimizes the matching error relative to current pixel block B according to the first feature of the invention, efficient approximation is accomplished by the constitution of the second invention in which AC component vector <F> of the preceding pixel block F is adopted (utilized) as the first base for approximating AC component vector <B> of the current pixel block, primarily eliminating the necessity of calculation burden from searching the base. Further, taking advantage of self-similarity of the original image (preceding image), the second or following orthogonal base system can be easily formed for approximating the residual difference vector which concentrates the components to the peripheral portion of the current image, reduction in the number of the bases required as the whole being expected.

According to the third feature of the invention, assuming that the orthogonal base system for approximating AC component vector <B> of the current pixel block in the second invention is represented by the linear combination, $$\alpha_1 <V'_1> + \alpha_2 <V'_2> + \ldots + \alpha_{nk} <V'_{nk}>,$$

of the respective normalized orthogonal bases <V'$_q$> based on AC component vectors <U$_q$> of nest pixel block U$_q$, nk in number, including specific preceding pixel block F, the combination is transformed to the equivalent linear combination:

$$\beta_1 <U_1> + \beta_2 <U_2> + \ldots + \beta_{nk} <U_{nk}>,$$

which is equivalent to the above combination, utilizing AC-component vectors <U$_q$>, while the number of the bases nk, scalar development coefficients $\beta_q$ (q=1 to nk), and the co-ordinate (x,y) of nest pixel block U$_q$ as well as sub-sampling intervals (sx,sy) at least related to AC-component vectors <U$_q$> (q=2 to nk) are coded.

In the method according to the third feature of the invention, taking advantage of the constitution of the invention in which linear combination:

$$\beta_1 <U_1> + \beta_2 <U_2> + \ldots + \beta_{nk} <U_{nk}>,$$

making use of AC-component vector <U$_q$> of nest pixel block U$_q$ consisting of nk pixels (nk≦1) for approximating AC-component vector <B> of the current pixel block is obtained finally, and the number of the bases nk, scalar development coefficients $\beta_q$(q=1 to nk), and the co-ordinate (x,y) of nest pixel block U$_q$ as well as sub-sampling interval (sx,sy) at least related to AC-component vectors <U$_q$>(q=2 to nk) are coded, thereby a decoded image is easily obtained by decoding the codes by means of product sum calculation:

$$\beta_1 <U_1> + \beta_2 <U_2> + \ldots + \beta_{nk} <U_{nk}>,$$

with respect to AC-component vectors <U$_q$> of nest pixel block U$_q$ which is a non-orthogonal base system. Therefore, decoded images can be reproduced at a high speed (real time) with no burden to CPU, memory and so on of a machine like game-machine generally restricted from costs. This method for coding moving images much contributes to reproduction of moving images.

According to the fourth feature of the invention, current pixel block B itself is coded if the number of bases nk in the third invention exceeds a predetermined value. "Current pixel block B itself" here means the entire information of current pixel block B, in no relation to the method of coding. For example, the entire data of current pixel block B may be coded, or otherwise, current pixel block B may be divided into the average value (DC) of the block and the residual AC component and either is coded. This is the possible case where current image data not present in the preceding image data occur newly. Thus, any scene of moving images can be coded efficiently by the method according to the fourth feature of the invention.

According to the fifth feature of the invention, current pixel block B and specific preceding pixel block F corresponding thereto are either divided into subordinate pixel blocks of the same dimension, each of which is subjected to inter-frame adaptive orthogonal transformation.

In the method according to the fifth feature of the invention, taking advantage of the constitution in which inter-frame adaptive orthogonal transformation is performed for each subordinate pixel block having a small number of image elements (pixels), the burden from the inter-frame adaptive orthogonal transformation for each subordinate pixel block is reduced significantly. Further, the precision of approximation for the entire current pixel block B is improved, owing to the constitution in which approximation is conducted for each subordinate pixel block.

According to the sixth feature of the invention, current pixel block B is coded based on movement vector <M> indicating specific preceding pixel block F if the matching error relative to specific preceding pixel block F in the first invention does not exceed an acceptable value. Thus, a high speed coding process for the whole image is expected. It is noted that movement vector <M> of specific current pixel block B in the portion free from movement in the moving image is (0,0).

According to the seventh feature of the invention, the apparatus for coding a moving image comprises:

a first memory storing the image data of the present time;

a second memory storing the image data of the preceding frame;

a movement vector-calculating unit for calculating a movement vector indicating such a specific preceding pixel block that minimizes the matching error by comparing sequentially the current pixel block to be coded with the preceding pixel block within a predetermined region of the preceding frame; and an inter-frame adaptive orthogonal transformation coding unit for calculating one or more orthogonal base systems for approximating AC-component vector of the current pixel block by means of inter-frame adaptive orthogonal transformation having, as the nest, the preceding image data within a predetermined region including the specific preceding pixel block and coding the base systems, if the matching error relative to the specific preceding pixel block exceeds an acceptable value, so as to code these base systems.

Of course, this inter-frame adaptive orthogonal transformation coding unit may involve any of the processing functions defined in the second to fifth feature of the inventions.

According to the eighth feature of the invention, if the matching error relative to the specific preceding pixel block does not exceed the acceptable value, the current pixel block is coded based on the movement vector indicating the specific preceding pixel block, by means of the inter-frame adaptive orthogonal transformation coding unit in the eighth invention.

According to the ninth invention, a decoding unit is further provided for decoding/storing sequentially the pixel block of the present time based on the coding output of the inter-frame adaptive orthogonal transformation coding unit and the image data of the preceding frame in the second memory, in the apparatus according to the eighth or ninth feature of the invention, to transmit these to the second memory as the image data of the preceding frame. According to the tenth feature of the invention, the common preceding image data are used in the moving image-coding apparatus and the moving image-decoding apparatus for coding/decoding and reproduction.

In the recording medium according to the tenth feature of the invention capable of reading out by a computer, a program for executing a processing defined in any of the foregoing inventions, from first to sixth, in the computer is recorded.

BRIEF DESCRIPTION OF THE DRAWINGS

The invention will be explained in more detail in conjunction with the appended drawings, wherein:

FIG. 3 is a block diagram showing the construction of movement-compensated inter-frame AOT coding according to a preferred embodiment of the invention;

FIG. 11 is a flow chart of movement-compensated inter-frame AOT coding according to a preferred embodiment of the invention;

FIG. 12 is an image illustration of movement-compensated inter-frame AOT coding according to a preferred embodiment of the invention;

FIG. 13 is an image illustration of movement-compensated inter-frame AOT coding according to a preferred embodiment of the invention;

FIG. 14 is an image illustration of movement-compensated inter-frame AOT coding according to a preferred embodiment of the invention, FIG. 15 is an illustration showing the relation between the amount of code and image quality in a preferred embodiment of the invention; and FIG. 16 is an illustration showing the relation between the amount of code and image quality in a preferred embodiment of the invention.

DESCRIPTION OF PREFERRED EMBODIMENTS

Figure 1:
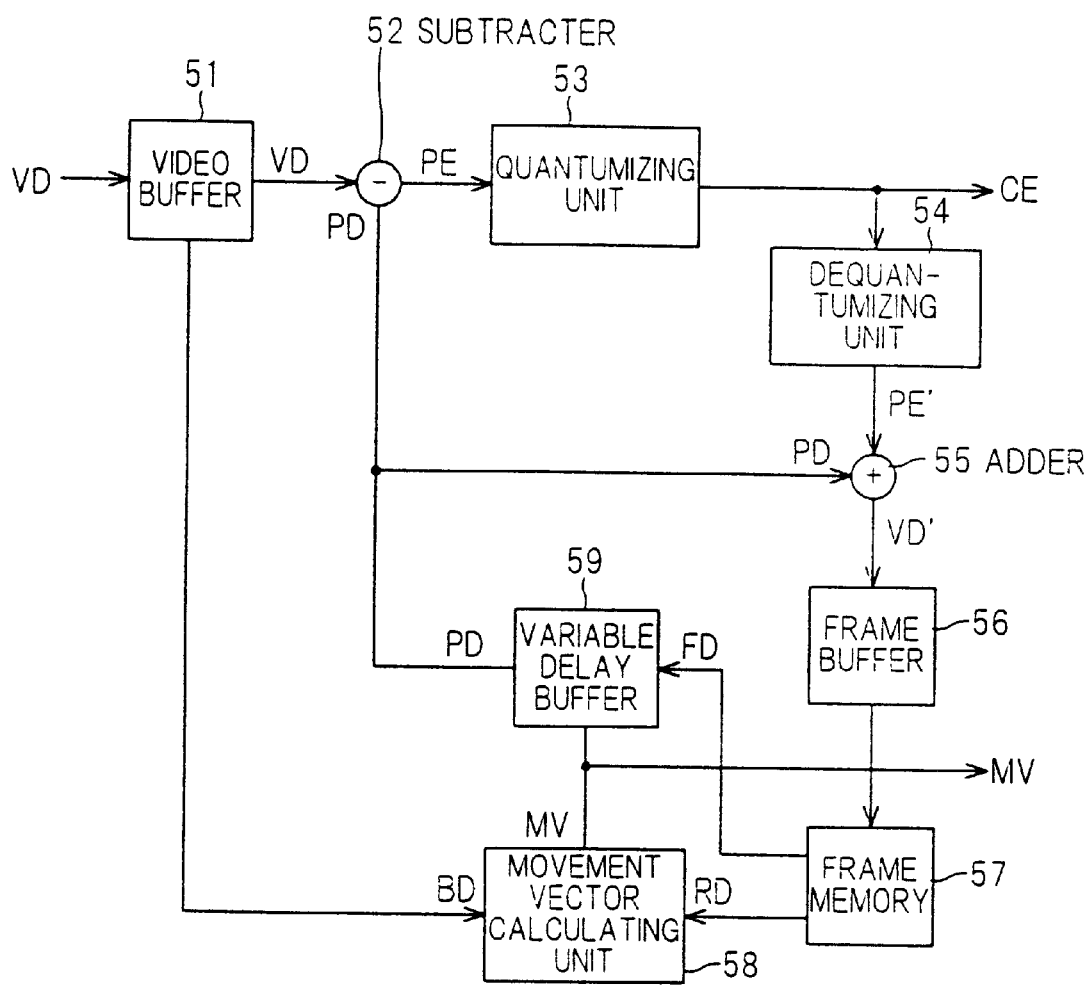
FIG. 1 is a block diagram of a conventional method for moving image coding.
Figure 2:
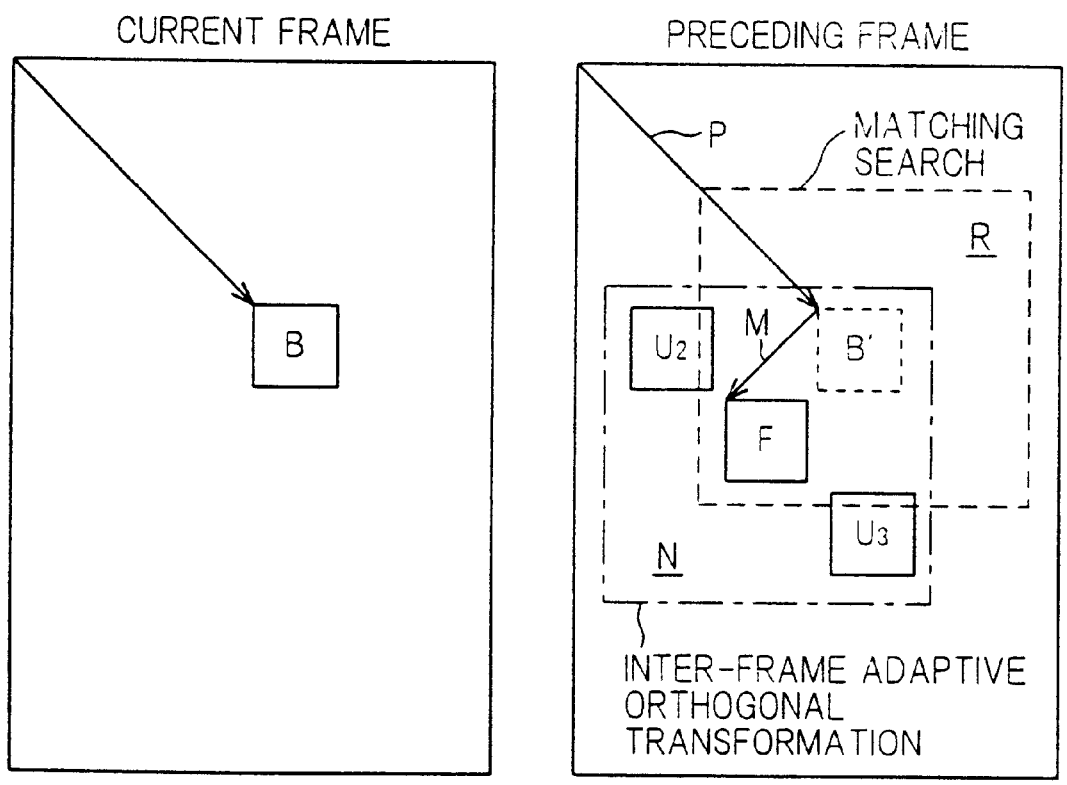
FIG. 2 is an illustration for explaining the concept of the present invention.

Preferred embodiments of the invention will be explained in the following with reference to the attached drawings. The same signs indicate the same or corresponding portions in all the drawings. Further, throughout the specification, the sign < > indicates a vector, the sign || || indicates the dimension of a vector, and the sign indicates the inner product of a vector. Vectors in the drawings and formulas are written in thick characters.

FIG. 3 illustrates the constitution of the movement-compensated inter-frame AOT (adaptive orthogonal transformation) coding according to an embodiment, FIG. 3(A) showing a block diagram of the moving image-coding apparatus. In FIG. 3, sign 11 indicates a video buffer storing inputted current image data VD; sign 16 indicates a frame memory storing the preceding image data FD (decoded image data to be reproduced) one frame earlier; sign 12 indicates a vector calculating unit for calculating a movement vector <M> of such a specific preceding pixel block that minimizes the matching error relative to the current pixel block MB by block-matching search calculation between current pixel block to be coded MB in current image data VD and the preceding image data FD; sign 13 indicates an inter-frame AOT-coding unit for performing ordinary movement-compensated inter-frame coding or movement-compensated inter-frame AOT-coding process according to the invention, in response to the result of searching movement vector <M>; sign 14 indicates a decoding unit for coding/reproducing current image data VD' based on coding data CD outputted from inter-frame AOT-coding unit 13 and on preceding image data FD in frame memory 16; sign 15 indicates a frame buffer accumulating sequentially reproduced image data VD' from decoding unit 14 to transmit the data of one frame at once, when they are accumulated, to frame memory 16 as preceding image data FD of one frame preceding.

FIG. 3(B) is a block diagram of moving image decoding apparatus adapted for use in combination with the moving image coding apparatus described above. In FIG. 3(B), sign 33 indicates a frame memory storing preceding-image data (decoded/reproduced image data) FD one frame earlier; sign 31 indicates a decoding unit performing ordinary movement-compensated inter-frame decoding or movement-compensated inter-frame AOT decoding process according to the invention, based on inputted coding data CD and preceding image data FD in frame memory 33; and sign 32 indicates a frame buffer accumulating sequentially reproduced image data VD' outputted from decoding unit 31 to transmit the accumulated data of one frame at once, when they are accumulated, to frame memory 33 as preceding image data FD of one frame earlier.

These functional blocks in the moving image coding/decoding apparatus can be accomplished by some hardware construction or some software construction consisting of a CPU (such as DSP) and a memory (ROM, RAM, etc.) storing the processing program therefor or the like. Coding data CD produced by moving image coding apparatus may be used not only for data communications including TV signal communication, but also for supplying game soft wares, CG animation soft wares and so on by way of decoding (reproducing) the moving image data stored once in a memory (CD-ROM, ROM cartridge, etc.) and read out later from the memory. In the following, the processing in the moving image coding apparatus will be explained in more detail, since the constitution of the moving image decoding apparatus described above is included in the constitution of the moving image coding apparatus.

FIG. 12 and FIG. 13 are imaginary illustrations, (1) and (2), of the movement-compensated inter-frame AOT coding process according to the embodiment. FIG. 12 shows the image of block matching search process, while FIG. 13 shows the image of movement-compensated inter-frame AOT coding process. In the following, movement-compensated inter-frame AOT coding process according to the embodiment will be briefly explained with reference to these figures.

In FIG. 12, video buffer 11 stores inputted current image data VD while frame memory 16 stores preceding image data FD one frame earlier. An example of current image data VD is an image of R-G-B system in consideration converted to Y-U-V system where Y corresponds to brightness data (8 bits), U and V correspond to color difference data (each 8 bits), respectively. Though processing of brightness data Y is primarily described in the following, data U and V can be processed in the similar manner. Moving vector calculating unit 12 performs block-matching calculation relative to preceding pixel block F of 8×8 pixels within a predetermined search region R of preceding image data FD, using current pixel block B to be coded included in current image data VD (for example, macro-block MB of 8×8 pixels), and further detects specific preceding pixel block F which minimizes the matching error between the two pixel blocks B and F, to obtain minimal movement vector <M> directed to the detected specific preceding pixel block F from the position of preceding pixel block B' corresponding to current pixel block B.

Inter-frame AOT coding unit 13 performs either ordinary movement-compensated inter-frame coding or movement-compensated inter-frame AOT coding according to the invention, depending on the result of searching of movement vector <M>. In more detail, merely movement vector <M> is code-outputted if current pixel block B can be approximated within acceptable error range 4Z by specific preceding pixel block F corresponding to movement vector <M>, while movement-compensated inter-frame AOT coding described below is performed if current pixel block B cannot be approximated within acceptable error range 4Z.

In FIG. 13, current pixel block B and specific preceding pixel block F corresponding to movement vector <M> are divided into subordinate pixel blocks $B_1$ to $B_4$ and $F_1$ to $F_4$, each consisting of 4×4 pixels, respectively. From each subordinate pixel block, block DC value is separated (i.e., AC components are extracted). These AC components are named current subordinate pixel vectors <$B_1$> to <$B_4$> and preceding subordinate pixel vectors <$F_1$> to <$F_4$>, respectively.

Then, at first, current subordinate pixel vector <$B_1$> is approximated by corresponding preceding subordinate pixel vector <$F_1$>. In more detail, the first unit vector <$V'_1$> (normalized orthogonal base) is obtained with respect to this preceding subordinate pixel vector <$F_1$>, which is used then to approximate current subordinate pixel vector <$B_1$> with the first orthogonal base vector $\alpha_1$<$V'_1$>, where $\alpha_1$ is a scalar coefficient that minimizes the magnitude $$D_1 = \|<B_1> - \alpha_1 <V'_1>\|^2$$

of residual difference vector <$d_1$> after approximation. If $D_1$ falls within the acceptable error range Z, further search of the base is not conducted.

If, however, $D_1$ does not fall within the acceptable error range Z, the second orthogonal base vector $\alpha_2$<$V'_2$> approximating residual difference vector <$d_1$> is sought from nest region N. In more detail, for example, nest pixel block U(2,1) is sampled from nest region N to liberate a DC value, making the residual AC component be a candidate second pixel vector <$U_{nk}$>(nk=2). (2,1) in nest pixel block U(2,1) means that sampling is conducted every two pixels with respect to X-axis and every pixel with respect to Y-axis, respectively. The candidate second pixel vector <$U_2$> is orthogonal to the first unit vector <$V'_1$> and allows one to obtain candidate second normalized orthogonal base vector <$V'_2$> which is used to approximate residual difference vector <$d_1$> with candidate second orthogonal base vector $\alpha_2$<$V'_2$>, where $\alpha_2$ is a scalar coefficient that minimizes the magnitude.

$$D_2 = \|<d_1> - \alpha_2 <V'_2>\|^2$$

of residual difference vector <$d_2$> after aforesaid approximation. Thus, similar processing to the above is performed for each of candidate second pixel vector <$U_2$> in accordance with all the predetermined sampling format within nest image region N, and finally, specific candidate second orthogonal base vector $\alpha_2$<$V'_2$> that minimizes the dimension $D_2$ is taken as second orthogonal base vector $\alpha_2$<$V'_2$>. The corresponding candidate second pixel block $U_2$ is named second pixel block $U_2$. If $D_2$ falls within acceptable error range Z, further search in nest image region N is discontinued at the moment.

If, however, $D_2$ does not fall within acceptable error range Z, the third orthogonal base vector $\alpha_3$<$V'_3$> for approximating residual difference vector <$d_2$> is sought from nest region N. Process follows likewise. If dimension $D_n$ falls within acceptable error range Z, the search in nest image region N is finished at the moment.

Further, the series of orthogonal base systems $\alpha_1$<$V'_1$>, $\alpha_2$<$V'_2$>, ..., $\alpha_n$<$V'_n$> obtained above is transformed to a base series $\beta_1$<$U_1$>, $\beta_2$<$U_2$>, ..., $\beta_n$<$U_n$> consisting of the product of scalar development coefficients h and nest pixel vector <U>, whereby the coordinate of the nest pixel block U corresponding to these scalar development coefficients β and nest pixel vectors <U> and so on are outputted in codes. Coding of other current subordinate pixel vectors, $\beta_2$ to $\beta_4$ is performed likewise. The movement-compensated inter-frame AOT coding process according to an embodiment will be explained in detail below.

Figure 4:
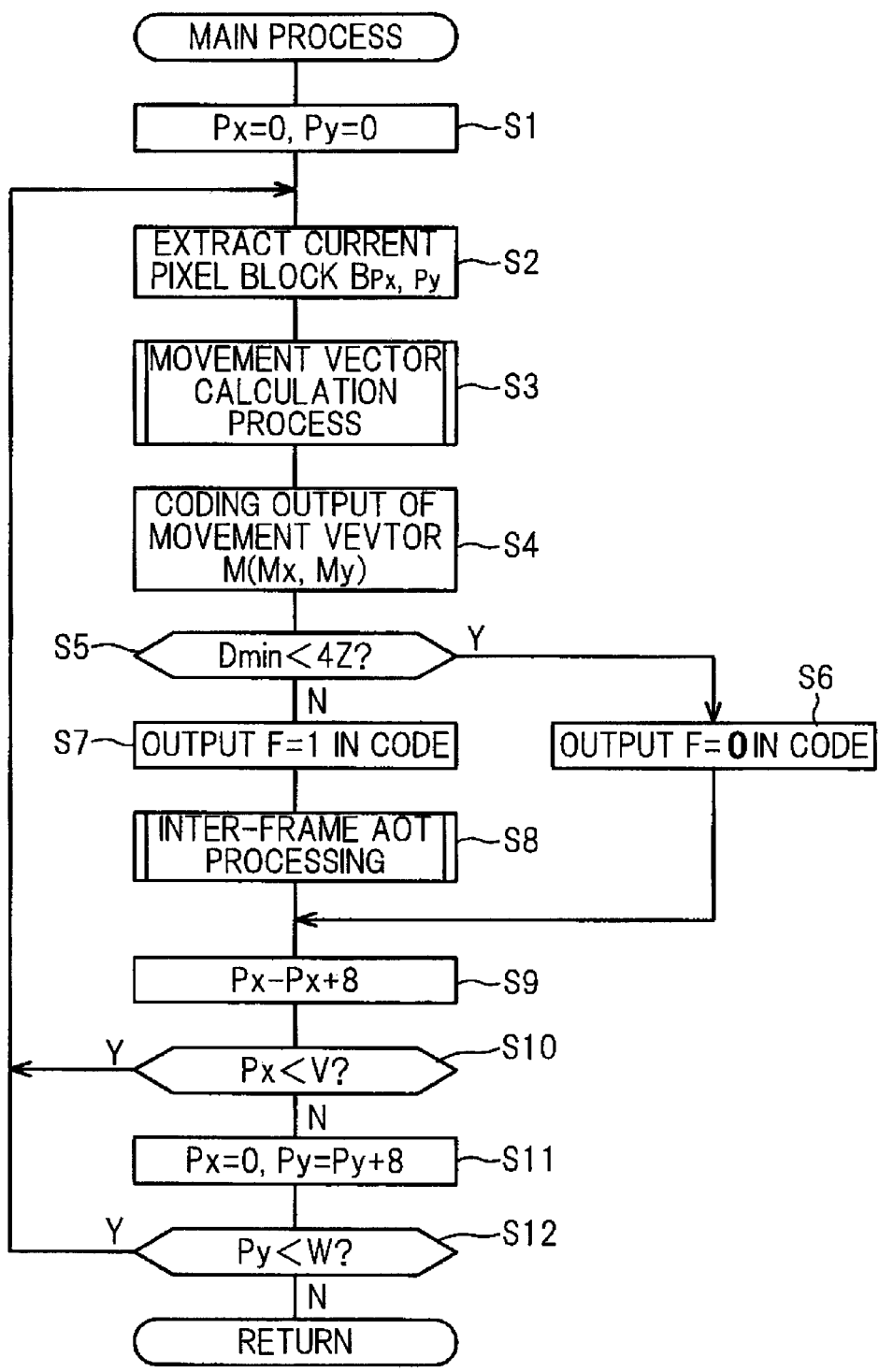
FIG. 4 is a flow chart of movement-compensated inter-frame AOT coding according to a preferred embodiment of the invention.

FIGS. 4 to 11 are flow charts ((1) to (8)) of the movement-compensated inter-frame AOT coding process according to another embodiment, FIG. 4 showing the main process. Every time when image data for one frame are subject to coding-process, input is given to the process. In step S1, position registers $P_x$, $P_y$ indicating position vectors <P> of current pixel block B to be coded are initialized to be $P_x=0$, $P_y=0$. In step S2, current pixel blocks $B_{Px}$, $B_{Py}$ consisting of 8×8 pixels indicated by position registers $P_x$, $P_y$, respectively, are read out. In step S3, movement vector calculation process to be described later is executed. This vector calculation process is a process in which specific preceding pixel block $F_{Px+Mx,Py+My}$ of 8×8 pixels that best approximates current pixel block $B_{Px,Py}$ is extracted from frame memory 16. In step S4. movement vector <M> thus obtained is outputted in codes, where $M_x$, $M_y$ are movement vector registers which hold X and Y components of movement vector <M> directed from preceding pixel block $B'_{Px,Py}$ corresponding in position to current pixel block $B_{Px,Py}$ to specific preceding pixel block $F_{Px+Mx,Py+My}$ obtained by the movement vector calculation above. In step S5, whether matching error:

$$D_{min} = <\|B_{Px,Py}> - <F_{Px+Mx,Py+My}>\|^2$$

between the two pixel blocks B and F is smaller than acceptable error 4Z or not is judged. 4Z means 4 times acceptable error Z defined previously per subordinate pixel block of 4×4 pixels. In this connection, a user may choose acceptable error Z to be small one if a high image quality is required, while choose it to be wide if a low image quality is acceptable.

If $D_{min}<4Z$, current pixel block $B_{Px,Py}$ may be approximated by preceding pixel block $F_{Px+Mx,Py+My}$ within acceptable range of error, then go to Step S6, outputting in codes block division flag f=0 (no block division). Unless $D_{min}<4Z$, go to step S7, outputting in codes block division flag f=1 (to divide a block). Block division flag f need to have only one bit. In step 8, inter-frame AOT process described later is performed.

In this occasion, current pixel block $B_{Px,Py}$ of 8×8 pixels is divided into four current subordinate pixel blocks $B_{Px,Py}$, $B_{Px+4,Py}$, $B_{Px,Py+4}$ and $B_{Px+4,Py+4}$, from each of which DC values (mean values for subordinate pixel blocks) are separated and code-outputted, and current subordinate pixel vectors:

<$B_{Px,Py}$>, <$B_{Px+4,Py}$>, <$B_{Px,Py+4}$> and <$B_{Px+4,Py+4}$>, are produced. Meanwhile, preceding pixel block $F_{Px+Mx,Py+My}$ consisting of 8×8 pixels corresponding to current pixel block $B_{Px,Py}$ of 8×8 pixels above is divided into four preceding subordinate pixel blocks consisting of 4×4 pixels:

<$F_{Px,Py}$>, <$F_{Px+4,Py}$>, <$F_{Px,Py+4}$> and <$F_{Px+4,Py+4}$>, from which DC values (mean values for subordinate pixel blocks) are separated and preceding subordinate pixel vectors:

<$F_{Px+Mx,Py+My}$>, <$F_{Px+Mx+4,Py+My}$>, <$F_{Px+Mx,Py+My+4}$>, <$F_{Px+Mx+4,Py+My+4}$>, consisting of residual AC-component are produced, respectively. For example, with respect to current subordinate pixel vector <$B_{Px,Py}$>, the inter-frame AOT processing described later is performed based on preceding subordinate pixel vector <$F_{Px+Mx,Py+My}$> corresponding thereto in position within nest image region N, and if necessary, one or more nest pixel vectors <$U_2$>, <$U_3$>, and so on extracted further from nest image region N. Other current subordinate pixel vectors, <$B_{Px+4,Py}$>, <$B_{Px,Py+4}$> and <$B_{Px+4,Py+4}$>, are processed likewise.

In step S9, eight is added to position register $P_x$, and in step S10, whether $P_x$ is smaller than V (for example, V=1280 rows) or not is judged. If $P_x<V$, return to step S2, and coding process similar to the above is performed with respect to next current pixel block $B_{Px+8,Py}$ which is shifted by 8 pixels on X axis. Following steps are likewise. Once when $P_x$ is not smaller than V, go to step S11 where position register $P_x$ is initialized to zero, and 8 is added to position register $P_y$. In step S12, whether $P_y$ is smaller than W (for example, W=60 lines) or not is judged. If $P_y<W$, return to step S2, and coding process similar to the above is performed with respect to next current pixel block $B_{Px,Py+8}$ which is shifted by 8 pixels on Y axis. Following steps are likewise. Once when $P_y$ is not smaller than W, then movement-compensated inter-frame AOT coding process for one frame is finished.

Figure 5:
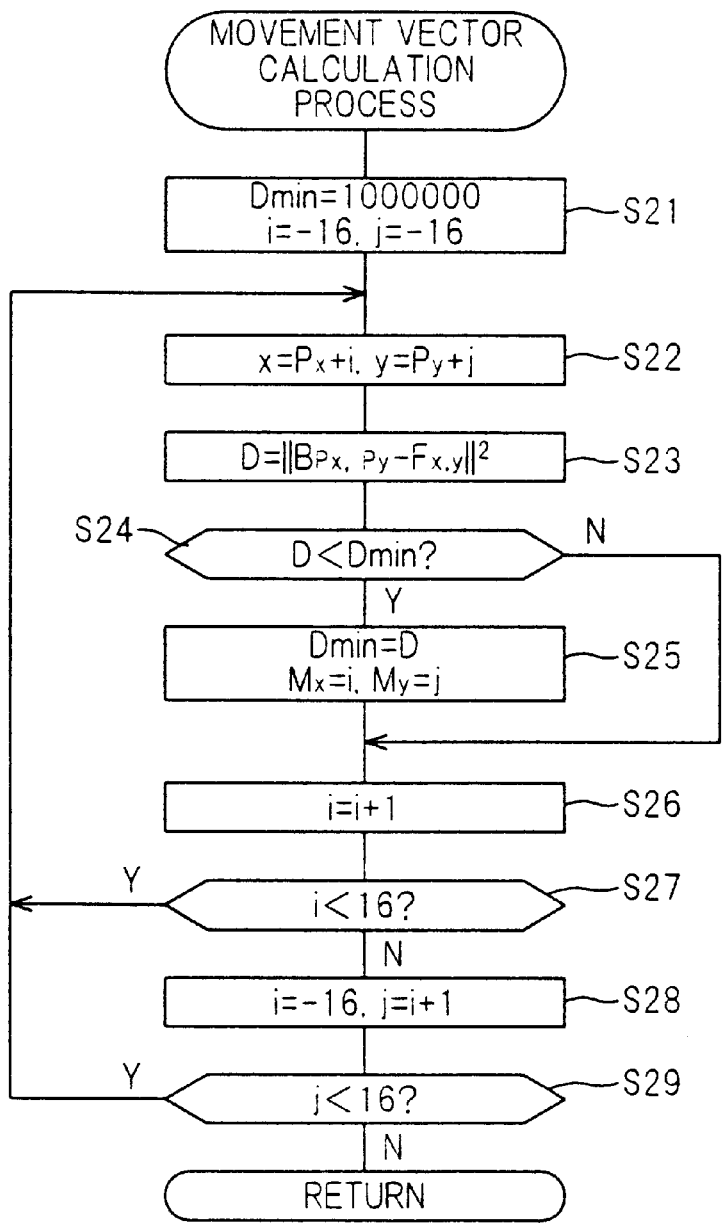
FIG. 5 is a flow chart of movement-compensated inter-frame AOT coding according to a preferred embodiment of the invention.

FIG. 5 shows the process of calculating movement vector in step S3 in FIG. 4 shown above. In step S21, a large value is set in minimum-value register $D_{min}$ for holding minimum value of block-matching error, and registers i and j indicating the coordinates within matching-search region R are initialized to i=−16 and j=−16, respectively. In Step 22, registers x and y indicating the coordinates in frame memory 16 are refreshed to x=$P_x$+i and y=$P_y$+j respectively. In step S23, quantity of block-matching error D=$\|B_{Px,Py}-F_{x,y}\|^2$ is obtained. In step S24, whether D is smaller than $D_{min}$ or not is judged. If D<$D_{min}$, minimum-value register $D_{min}$ is refreshed to =D, holding movement vector registers $M_x$ and $M_y$ to be $M_x$=i and $M_y$=j, respectively, as they are. If D is not smaller than $D_{min}$, then the process in step S25 is skipped.

In step S26, 1 is added to register i, and in step S27, whether i is smaller than 16 or not is judged. If i>16, return to step S22, and coding process similar to the above is performed with respect to next preceding pixel block $F_{x+1,y}$ which is shifted by 1 pixel on X axis. Following steps are likewise. Once when i is not smaller than 16, then go to step S28, in which register i is initialized to i=−16 and 1 is added to register j. In step S29, whether j is smaller than 16 or not is judged. If j<16, return to step S22, in which coding process similar to the above is performed with respect to next preceding pixel block $F_{x,y+1}$ which is shifted by 1 pixel on Y axis. Following steps are likewise. Once when j is not smaller than 16, then the movement vector calculation process is finished. At this moment, minimum-value register $D_{min}$ holds minimum block-matching error D, while movement vector registers $M_x$ and $M_y$ respectively hold movement vector <M> of specific preceding pixel block $F_{x,y}$ which provides such minimum value of block-matching error D.

Figure 6:
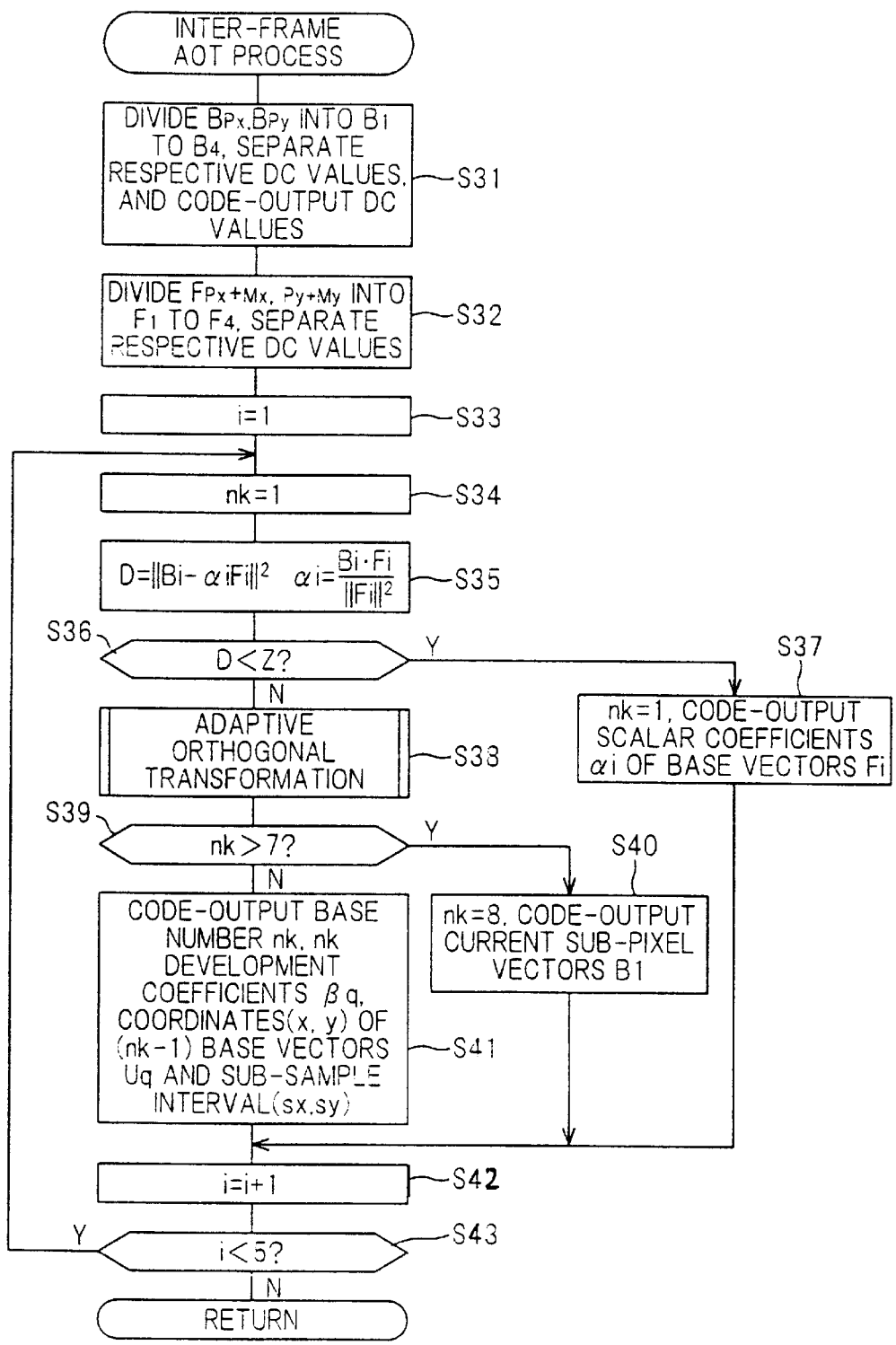
FIG. 6 is a flow chart of movement-compensated inter-frame AOT coding according to a preferred embodiment of the invention.

FIG. 6 shows the inter-frame AOT processing in step S8 in FIG. 4 above. In step 31, current pixel block $B_{Px,Py}$ of 8×8 pixels is divided into four current subordinate pixel blocks $B_1$ to $B_4$, from each of which DC value (mean value of brightness data Y of current subordinate pixel blocks) is separated and code-outputted. Residual AC components after the DC values are separated are named current subordinate pixel vectors, <$B_1$> to <$B_4$>. In step 32, similarly, preceding pixel block $F_{Px+Mx,Py+My}$ consisting of 8×8 pixels is divided into four preceding subordinate pixel blocks, $F_1$ to $F_4$, consisting of 4×4 pixels, from each of which DC value (mean value of brightness data Y of preceding subordinate pixel blocks) is separated. Residual AC components after the DC values are separated are named preceding subordinate pixel vectors, <$F_1$> to <$F_4$>.

In step S33, register i for indexing subordinate pixel vectors, <$B_i$>, <$F_i$>, is initialized to be i=1. In step S34, base number counter, nk, is initialized to be nk=1. In step S35, amount of residual difference vector <d>, being D=$\|<B_i>-\alpha_i<F_i>\|^2$, in which current subordinate pixel vector <$B_i$> is approximated optimally with corresponding preceding subordinate pixel vector <$F_i$>, is obtained, where $\alpha_i$=<$B_i$>·<$F_i$>/$\|<F_i>\|^2$.

FIG. 14(A) shows in image the process of optimal approximation of current subordinate pixel vector <$B_i$> with preceding subordinate pixel vector <$F_i$>. In the figure, amount D of residual difference vector <d>, being D=$\|<B_i>-\alpha_i<F_i>\|^2$, is the smallest in the case where base vector $\alpha_i$<$F_i$> is orthogonal to residual difference vector <d> which is <d>=<$B_i$>−$\alpha_i$<$F_i$> (inner product is null), thus scalar coefficient $\alpha_i$ a of normalized base vector <$F_i$> for optimal approximation is obtained by:

$$(B_i - \alpha_i F_i) \cdot \alpha_i F_i = 0$$

$$\alpha_i B_i \cdot F_i - \alpha_i^2 F_i \cdot F_i = 0$$

$$\alpha_i = \frac{B_i \cdot F_i}{\|F_i\|^2}$$

Returning to FIG. 6, in step S36, whether amount D of residual difference vector <d> is smaller than Z or not is judged. If D<Z, current subordinate pixel vector <$B_i$> can be approximated with preceding subordinate pixel vector <$F_i$> compensated for movement, thus, one goes to step S37, in which scalar development coefficient $\alpha_i$ for base number nk being 1 and base vector <$F_i$> is outputted in code, the position coordinate of preceding subordinate pixel vector $F_i$ corresponding to base vector <$F_i$> is already known by decoding unit 14 of moving image coding apparatus or by decoding unit 31 of moving image decoding apparatus. If D is not smaller than Z, go to step S38, in which the adaptive orthogonal transformation process described later is performed. This adaptive orthogonal transformation process is a process for seeking one or more of nest pixel vectors <U> required to approximate current subordinate pixel vector <$B_i$> within acceptable error Z, from nest image region.

In step S39, whether the total base number, nk, required for the AOT processing in step S38 is larger than 7 or not. If nk>7, go to step S40 because high image quality and a high image compression rate are not expected from the result of this AOT process. In step S40, number of bases nk being 8 and current subordinate pixel vector <$B_i$> are outputted. Such an occasion can arise in the case where a entirely new pixel block $B_i$ appears in the current frame. If nk is not larger than 7, (nk=2 to 7), go to step S41, in which number of bases nk, scalar development coefficients $\beta_q$ of nk in number (q=1 to nk), coordinate (x,y) of base vectors <$U_q$>(q=2 to nk) of nk−1 in number excluding first base vector <$F_i$> and the information of sub-sampling interval (sx,sy) are outputted in codes. Scalar development coefficient $\beta_q$ will be explained later.

In step 42, 1 is added to register i, and in step S43, whether i is smaller than 5 or not is judged. If i is smaller than 5, go to step S34, in which the process similar to the above is performed with respect to the next current subordinate pixel vector <$B_{i+1}$>. Once when i is not smaller than 5, coding process of current subordinate pixel vectors <$B_1$> to <$B_4$> is finished so as to escape from this process.

Figure 7:
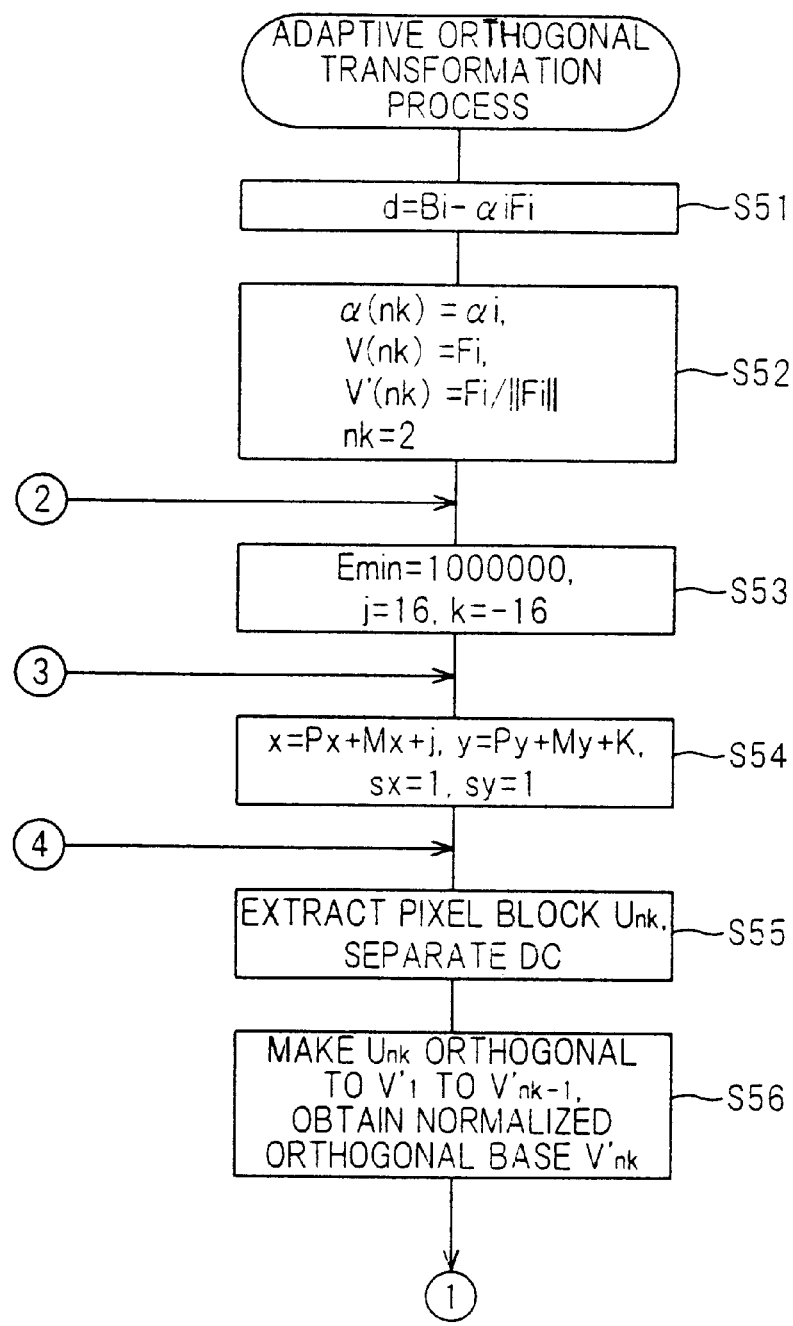
FIG. 7 is a flow chart of movement-compensated inter-frame AOT coding according to a preferred embodiment of the invention.
Figure 8:
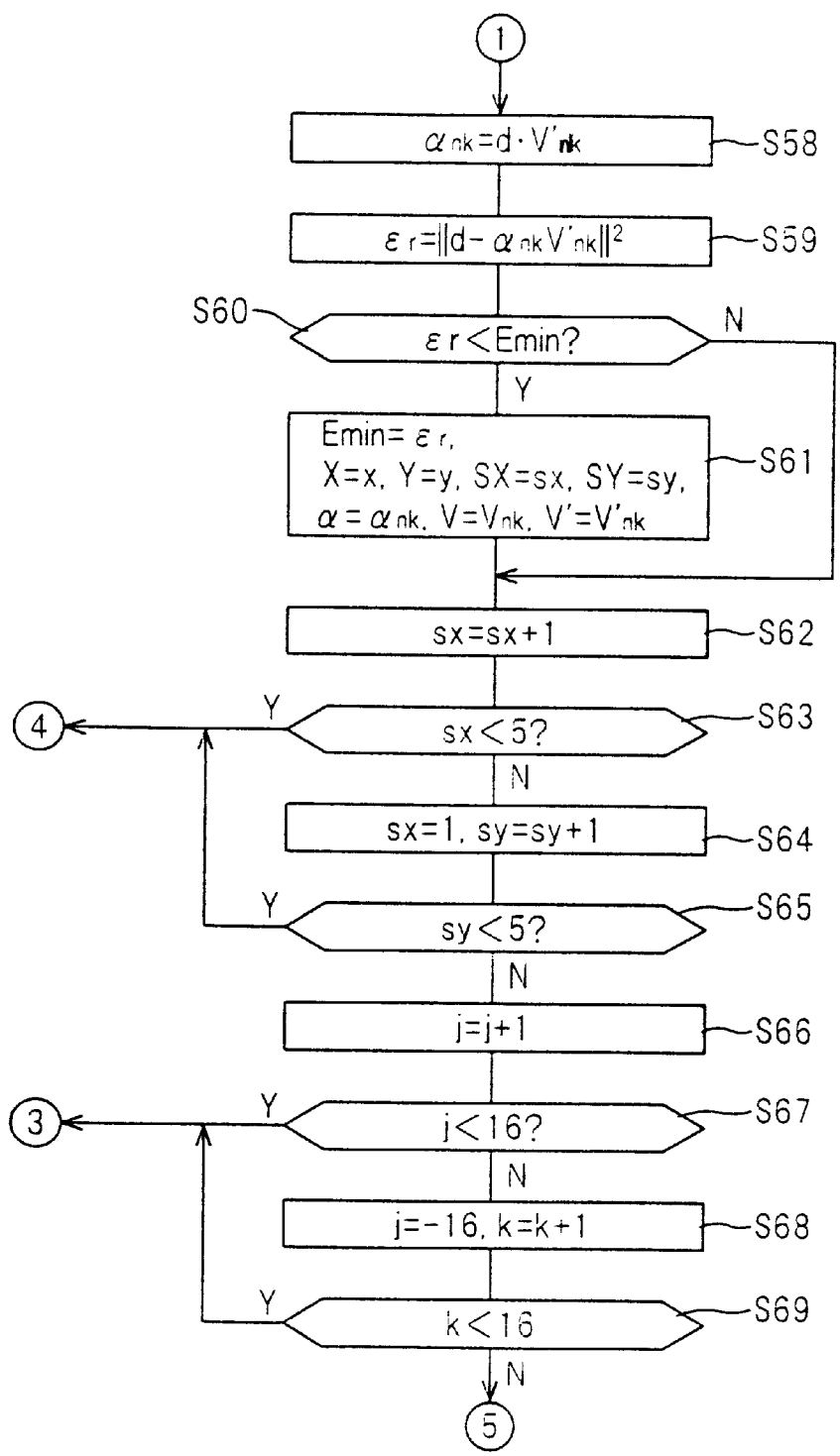
FIG. 8 is a flow chart of movement-compensated inter-frame AOT coding according to a preferred embodiment of the invention.
Figure 9:
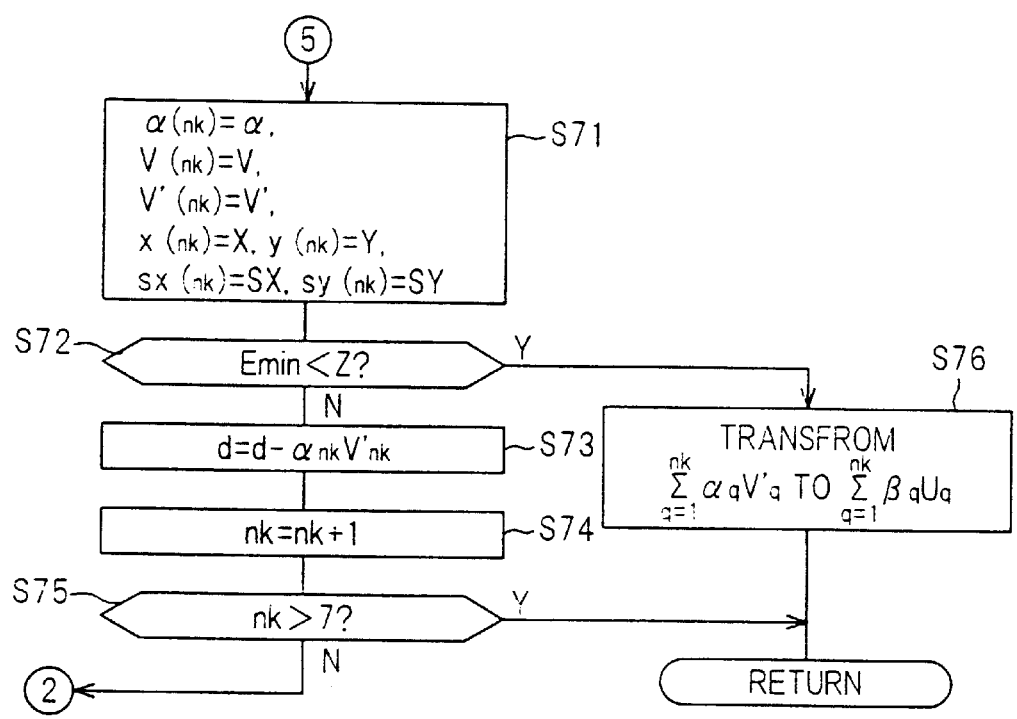
FIG. 9 is a flow chart of movement-compensated inter-frame AOT coding according to an embodiment.

FIG. 7 to FIG. 9 show the adaptive orthogonal transformation process in step S38 in FIG. 6 above. This adaptive orthogonal transformation process will be explained now with reference to FIG. 12. Assuming the position vector of current pixel block B to be <P> and the movement vector <M> detected by inter-frame movement-compensation process to be <M>, a region of j[−16,15]×k[−16,15] pixels around position vector <P>+<M> is taken to be nest image region N, so as to take the region most correlated with current pixel block B to be coded. For searching base vector <$U_{nk}$>, the peak of subordinate pixel block:

$$(j,k) \in [-16,15] \times [-16,15]$$

is set for every pixel, horizontal and vertical, the sub-sample interval being $$(sx,sy) \in \{(1,1),(1,2),(1,3),\ldots,(2,1)(2,2),(2,3),\ldots,(3,1),(3,2),(3,3),\ldots\}.$$

For example, for (sx,sy)=(2,1), pixel data for 4×4 pixels in total are collected from the region extended by one pixel each in the x-direction on the nest image data. Further, DC values are separated to be base vector <$U_{(2,1)}$>. For (sx,sy)=(1,2), pixel data for 4×4 pixels in total are collected from the region extended by one pixel each in the y-direction on the nest image data. Further, DC values are separated to be base vector <$U_{(1,2)}$>. For (sx,sy)=(2,3), pixel data for 4×4 pixels in total are collected from the region extended in the x- and y-directions, respectively, on the nest image data. Further, DC values are separated to be base vector <$U_{(2,3)}$>. As these are exemplary, the dimension of nest image region N, sub-sampling interval for nest pixel block U and so on may be set arbitrarily.

Returning to FIG. 7, in step S51, residual difference vector <d> for current subordinate pixel vector <$B_i$> approximated optimally by corresponding preceding subordinate pixel vector <$F_i$> is obtained according to:

$$<d> = <B_i> - \alpha_i <F_i>.$$

In step S52, scalar coefficient $\alpha_i$ preceding subordinate pixel vector <$F_i$> and normalized preceding subordinate pixel vector <$F'_i$> are stored in escaping regions $\alpha$(nk), V(nk) and V'(nk), respectively, referred to number of bases nk(=1) in memory, then base-number counter is rendered to be nk=2.

In step S53, a large value is set to residual difference register $E_{min}$ and registers j and k indicating the coordinate of nest image region are initialized to j=−16, k=−16. In step S54, registers x and y indicating the coordinate in frame memory 16 are refreshed to x=$P_x$+$M_x$+j, y=$P_y$+$M_y$+k, and further, sub-sampling intervals sx and sy are initialized to sx=1, sy=1. In step S55, subordinate pixel block $U_{nk,x,y,sx,sy}$ of 4×4 pixels in accordance with sub-sampling interval (sx,sy) is extracted from the position starting from address (x,y) of frame memory 16, and DC component is separated from the block. The DC component is named base vector <$U_{nk}$>. In step S56, base vector <$U_{nk}$> is rendered orthogonal to normalized base vectors <$V'_1$> to <$V'_{nk-1}$> up to the last time by Gram-Schmidt orthogonalizing method to obtain normalized orthogonal base vector <$V'_{nk}$>.

In FIG. 14(B), orthogonalizing method by Gram-Schmidt is shown in image. In the figure, first base vector <$F_1$> is selected as first orthogonal base vector <$V_1$> as it is. Further, first normalized orthogonal base vector <$V'_1$>, being a unit vector, may be represented by the formula:

$$V'_1 = \frac{F_1}{\|F_1\|} = \alpha_{11} F_1 = \alpha_{11} V_1$$

where $a_{11}$ is a scalar coefficient. Next, assuming that second base vector $<U_2>$ is extracted from nest image, second orthogonal base $<V_2>$ which is orthogonal to aforesaid first normalized orthogonal base $<V'_1>$ can be taken as:

$$V_2 = U_2 + mV'_1 \quad \text{[Formula 1]}$$

utilizing second base vector $<U_2>$ shown above. Then, based on the relation $$<V_2> \cdot <V'_1> = 0,$$

following relation is obtained, $$V_2 V'_1 = (U_2 + mV'_1) \cdot V'_1 = U_2 \cdot V'_1 + m(V'_1 \cdot V'_1) = U_2 V'_1 + m = 0$$

scalar coefficient m being then:

$$m = -(U_2 \cdot V'_1)$$

By substituting this scalar coefficient in Formula 1 above, second orthogonal base $<V_2>$ is represented by:

$$V_2 = U_2 - (U_2 \cdot V'_1) V'_1$$

Further, second normalized orthogonal base vector $<V'_2>$, being a unit vector, is obtained by:

$$V'_2 = \frac{V_2}{\|V_2\|} = \frac{U_2 - (U_2 \cdot V'_1) V'_1}{\|U_2 - (U_2 \cdot V'_1) V'_1\|}$$

The following process is conducted likewise. Generally, n-th normalized orthogonal base vector $<V'_n>$ is obtained by:

$$V'_n = \frac{V_n}{\|V_n\|} = \frac{U_n - (U_n \cdot V'_1) V'_1 - \ldots - (U_n \cdot V'_{n-1}) V'_{n-1}}{\|U_n - (U_n \cdot V'_1) V'_1 - \ldots - (U_n \cdot V'_{n-1}) V'_{n-1}\|}$$

Returning to FIG. 8, in step S58, scalar coefficient α(nk) of base vector $<V'_{nk}>$ to minimize the distance from residual difference vector $<d>$ is obtained by $\alpha(nk) = <d> \cdot <V'_{nk}>$, using normalized orthogonal base vector $<V'_{nk}>$, provided that $\|<V'_{nk}>\|^2 = 1$. This optimal approximation is similar to that shown in FIG. 14(A) in image. In step S59, the amount of error vector $\epsilon r = \|<d> - \alpha_{nk} <V'_{nk}>\|^2$ is obtained, with residual difference vector $<d>$ approximated by orthogonal base vector $\alpha_{nk} <V'_{nk}>$. In step S60, whether εr is smaller than $E_{min}$ or not is judged. If εr is smaller than $E_{min}$, εr, x, y, sx and sy then are held in step S61 in register $E_{min}$, X, Y, SX and SY for storing various information concerning the minimum value of εr. Scalar coefficient $\alpha_{nk}$ then is stored in register α, orthogonal base vector $<V_{nk}>$ then is stored in memory domain V for orthogonal base vector, while normalized orthogonal base vector $<V'_{nk}>$ then is stored in memory domain V' for normalized orthogonal base vector. In the case where εr is not smaller than $E_{min}$ in the judgment in step S60 above, the process in step S61 above is skipped.

In step S62, 1 is added to sub-sampling interval sx, and in step S63, whether sx is smaller than 5 or not is judged. In the case where sx is smaller than 5, return to step S55 in FIG. 6, and now other type of extracted pixel vector $<U_{nk}>$ extracted with different sample interval sx is subjected to the process similar to the above. The following process is performed likewise. Once when sx is not smaller than 5 in the judgment in step S63, sx is initialized to 1 and 1 is added to sy in step S64. In step S65, whether sy is smaller than 5 or not is judged. If sy is smaller than 5, return to step S55 in FIG. 6, and now another type of extracted pixel block $U_{nk}$ extracted with different sample interval sy is subjected to the process similar to the above. Once when sy is not smaller than 5 in the judgment in step S65, then, all types of extracted pixel block $U_{nk}$ based on different sample intervals (sx,sy) have been checked with respect to starting position (x,y) in nest image region N.

In step S66, 1 is added to starting position register j in nest image region N, and whether j is smaller than 16 or not is judged in step S67. If j is smaller than 16, return to step S54 in FIG. 7, and now each type of extracted pixel block $U_{nk}$ extracted from the starting position shifted by one pixel in the direction of j (horizontal) in nest image region N is subjected to similar processing. The following process is performed likewise. Once when j is not smaller than 16, starting position register j is initialized to −16 and 1 is added to starting position register k in step S68. In step S69, whether k is smaller than 16 or not is judged. In the case where k is smaller than 16, return to step S54 in FIG. 7 and, now, each type of extracted pixel block $U_{nk}$ extracted from the starting position shifted by one pixel in the direction of k (vertical) in nest image region N is subjected to similar processing. Once when k is not smaller than 16 in the judgment in step S69, then all types of extracted pixel block $U_{nk}$ based on all sub-sample intervals:

$$(sx,sy) \in \{(1,1),(1,2),(1,3),(1,4),(2,1),(2,2),(2,3), \ldots ,(4,4)\}.$$

have been checked with respect to all starting positions:

$$(j,k) \in [-16,15] \times [-16,15]$$

in nest image region N. Thus, the process advances to step S71 in FIG. 8.

In step S71, each memory content in registers X, Y, SX, SY and a holding the information concerning the minimum value of $\epsilon_r$, above and in memory regions V and V' are stored in the respective escaping regions x(nk), y(nk), sx(nk), sy(nk), α(nk), V(nk) and V'(nk). In step S72, whether $E_{min}$ is smaller than Z or not is judged. In the case where $E_{min}$ is not smaller than Z, residual difference vector $<d>$ is refreshed in step S73 according to:

$$<d> = <d> - \alpha_{nk} <V'_{nk}>$$

In step S74, 1 is added to base number counter nk. In step S75, whether nk is larger than 7 or not. In the case where nk is not larger than 7, return to step S53 in FIG. 7, where the process similar to the above is performed so as to approximate residual difference vector $<d>$ refreshed as above. The following process is conducted likewise. Then, once when amount $E_{min}$ of residual difference vector $<d>$ is smaller than acceptable value Z in the judgment in step S72, go to step S76.

FIG. 14(C) shows the image of approximation of residual difference vector $<d>$ for base number nk=3. At first, first base vector $\alpha_1 <V'_1>$ minimizing error $\epsilon_r$ relative to residual difference vector $<d>$ can be obtained. Then, second orthogonal base vector $\alpha_2 <'_2>$ being orthogonal to this first base vector $\alpha_1 <V'_1>$ and minimizing error $\epsilon_r$, relative to refreshed remaining residual difference vector $<d'>$ can be obtained. Then, third orthogonal base vector $\alpha_3 <V'_3>$ being orthogonal to this second orthogonal base vector $\alpha_2 <V 2>$ and minimizing error $\epsilon_r$ relative to refreshed remaining residual difference vector $<d''>$ can be obtained.

Returning to FIG. 9, in step S76, a series of linear combination of orthogonal base vectors $\alpha_q <V'_q>$ (q=1 to nk) is transformed to a linear combination formed of the product of scalar development coefficient $\beta_q$ and extracted pixel (non-orthogonal base) vector $<U_q>$ (q=1 to nk).

The method for transformation in step S76 above will be explained here. Assuming q to be q=1 to nk and that, a matrix U of extracted pixel vectors $<U_q>$, a matrix B of scalar development coefficients $\beta_q$, a matrix V' of normalized orthogonal base vectors $<V'_q>$ and a matrix A of scalar coefficients $\alpha_q$ are, respectively:

$$U = [U_1, U_2, \ldots U_{nk}] \quad B = \begin{bmatrix} \beta_1 \\ \beta_2 \\ \vdots \\ \beta_{nk} \end{bmatrix}$$

$$V' = [V'_1, V'_2, \ldots V'_{nk}] \quad A = \begin{bmatrix} \alpha_1 \\ \alpha_2 \\ \vdots \\ \alpha_{nk} \end{bmatrix}$$

the transformation in step S76 mentioned above can be accomplished by taking:

$$U\beta = V'A$$

For solution with respect to matrix B, matrix U is multiplied by matrix $U^T$ ($U^T$ is the reversed matrix of U) to from the left side of the formula so as to transform matrix U to square matrix, to obtain:

$$U^T U\beta = U^T V'A$$

This matrix ($U^T U$) is developed as:

$$U^T U = \begin{bmatrix} U_1 \\ U_2 \\ \vdots \\ U_{nk} \end{bmatrix}$$

$$[U_1, U_2, \ldots U_{nk}] = \begin{bmatrix} U_1 \cdot U_1 & U_1 \cdot U_2 & \ldots & U_1 \cdot U_{nk} \\ U_2 \cdot U_1 & U_2 \cdot U_2 & \ldots & U_2 \cdot U_{nk} \\ \vdots & \vdots & \vdots & \vdots \\ U_{nk} \cdot U_1 & U_{nk} \cdot U_2 & \ldots & U_{nk} \cdot U_{nk} \end{bmatrix}$$

As $<U_i> \cdot <U_i>$ represents an inner product and $<U_i> \cdot <U_j> = <U_j> \cdot <U_i>$, a square matrix symmetric with respect to diagonal elements is obtained, and reverse matrix exists as $<U_i>$ is different from $<U_j>$. Thus, further, matrix ($U^T U$) is multiplied by reverse matrix $(U^T U)^{-1}$ from the left to obtain:

$$(U^T U)^{-1} U^T U\beta = \beta = (U^T U)^{-1} U^T V'A$$

In this connection, assuming three-dimensional vectors $<U_1> = [1, 2, 3]$ and $<U_2> = [4, 2, 1]$, the square matrix ($U^T U$) is:

$$U^T U = \begin{bmatrix} U_1 \\ U_2 \end{bmatrix} [U_1 \; U_2] = \begin{bmatrix} U_1 \cdot U_1 & U_1 \cdot U_2 \\ U_2 \cdot U_1 & U_2 \cdot U_2 \end{bmatrix} = \begin{bmatrix} 14 & 11 \\ 11 & 21 \end{bmatrix}$$

and the reverse matrix $(U^T U)^{-1}$ is:

$$[U^T U]^{-1} = \begin{bmatrix} \frac{21}{173} & -\frac{11}{173} \\ -\frac{11}{173} & \frac{14}{173} \end{bmatrix}$$

Owing to the constitution in which scalar development coefficients $\beta_q$(q=1 to nk) thus obtained, the coordinates of extracted pixel blocks $U_q$(q=1 to nk), and the information of sub-sample interval are outputted in codes, orthogonal calculation above by Gram-Schmidt method need not be done on decoding and normalization to 1 of norm is omitted.

If nk is larger than 7 in the judgment in step S75, this process is discontinued because higher image quality and higher ratio of image compression are expected in coding-output no more even if this process of adaptive orthogonal transformation is continued further.

Figure 10:
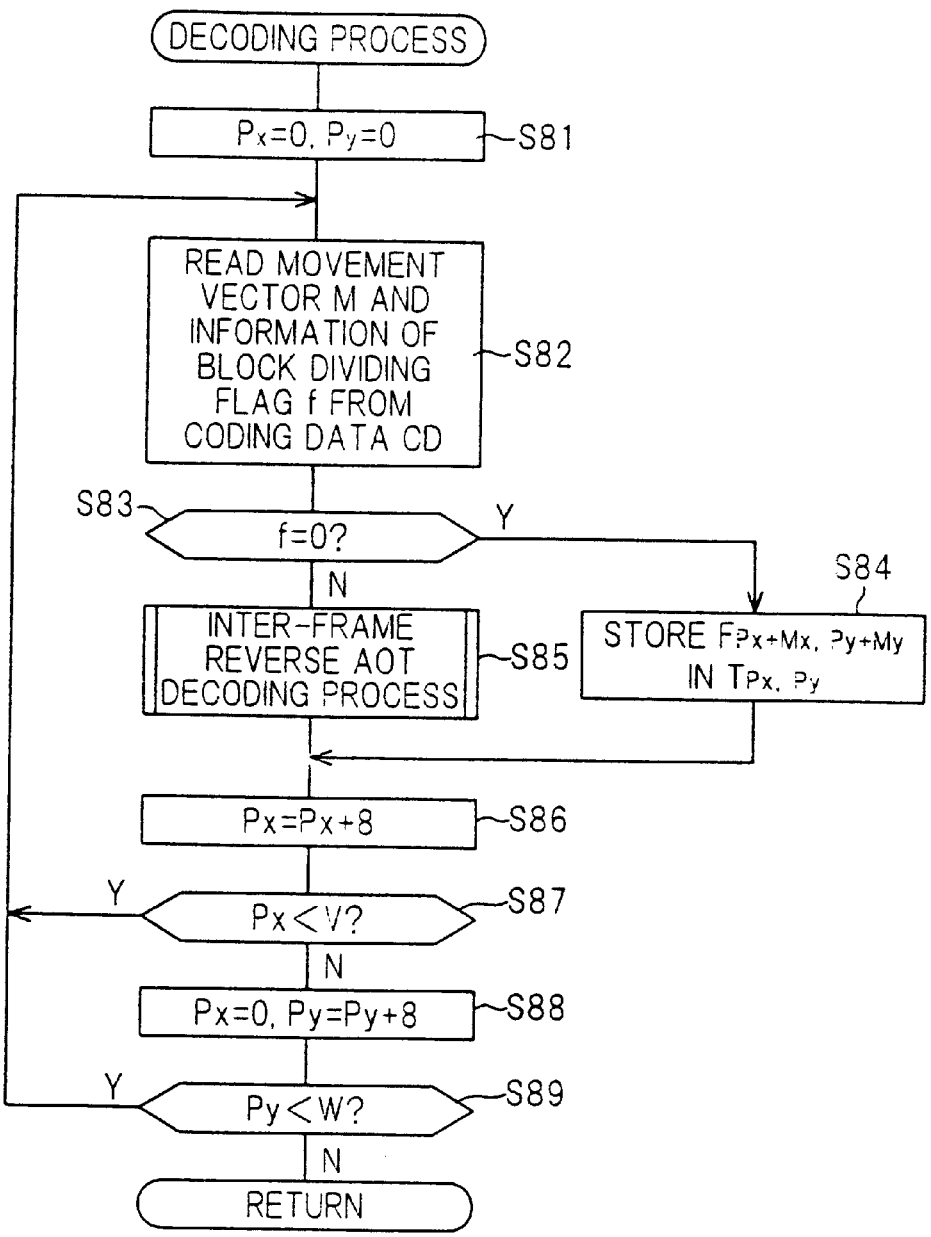
FIG. 10 is a flow chart of movement-compensated inter-frame AOT coding according to a preferred embodiment of the invention.

FIG. 10 and FIG. 11 show respectively, a decoding process according to an embodiment. Though these process are decoding processes in a moving image coding apparatus, they are also applicable to decoding process in a moving image decoding apparatus. FIG. 10 shows the main process of decoding, to which the first coding data CD for one image are inputted when they are received. In step S81, position registers $P_x$, $P_y$ indicating the storage coordinate of decoding pixel block T of 8×8 pixels are initialized to $P_x$=0, $P_y$=0. In step S82, coding data ($M_x$, $M_y$) of movement vector $<M>$ and the block dividing flag (corresponding to one bit) are read from coding data CD. In step S83, whether block dividing flag f is 0 or not is judged. If f=0 (the block is not divided), preceding pixel block $F_{Px+Mx}$, $F_{Py+My}$ of 8×8 pixels is read out from address (Px+Mx,Py+My) in memory 16 in step S84 and stored in address ($P_x,P_y$) in frame buffer 15 as decoding pixel block $T_{Px,Py}$. If f=1 (the block is divided), inter-frame reverse AOT decoding process described later is performed in step S85.

In step S86, 8 is added to position register $P_x$, and whether $P_x$ is smaller than V or not is judged in step S7. If $P_x$ is smaller than V, return to step S82, in which the decoding process similar to the above is performed with respect to next decoding pixel block $T_{Px+8,Py}$ shifting 8 pixels in the direction of X-axis. The following process is conducted likewise. Once when $P_x$ is not smaller than V in the judgment in step S87, go to step S88 to initialize position register $P_x$ to be 0 and 8 is added to position register $P_y$. In step S89, whether $P_y$ is smaller than W or not is judged. If $P_y$ is smaller than W, return to step S82, in which the decoding process similar to the above is performed with respect to next decoding pixel block $T_{Px,Py+8}$ shifting 8 pixels in the direction of Y-axis. The following process is performed likewise. Once when $P_y$ is not smaller than W, then the decoding process for the one frame is finished.

FIG. 11 shows the inter-frame reverse AOT decoding process in step S85 in FIG. 10. In step S90, the DC values, $DC_i$(i=1 to 4), of respective subordinate pixel blocks is read from coding data CD. In step S91, register i for indexing preceding subordinate pixel block $F_i$ and decoded subordinate pixel block $T_i$ is initialized to i=0. In step S92, base number nk is read from coding data CD. In step S93, whether nk is larger than 7 or not is judged. If nk is larger than 7, go to step S94, in which current subordinate pixel vector $<B_i>$ is read from coding data CD. DC value, $DC_i$, is added to the vector, and the sum is stored as current subordinate pixel block $T_i$ in the corresponding position in frame buffer 15 (the position specified by position register ($P_x,P_y$) and index register i for subordinate pixel block).

If nk is not larger than 7, go to step S95, where preceding pixel block $F_{Px+Mx}$, $F_{Py+My}$ of 8×8 pixels is divided into four preceding subordinate pixel blocks $F_i$(i=1 to 4) of 4×4 pixels, from each of which DC-value, $DC_i$(i=1 to 4), is separated. The residual AC-components are called preceding subordinate pixel vectors $F_i$(i=1 to 4).

In step S96, whether nk is 1 or not is judged. If nk is 1, go to step S97, in which scalar coefficients a are read from coding data CD, which are reproduced by decoded subordinate pixel vectors $<T_i>\alpha_i<F_i> +DC_i$ and stored in the corresponding positions in frame buffer 15. If nk is not 1, scalar development coefficients $\beta_q$ as many as nk, the coordinates (x,y) of extracted pixel blocks $<U_q>$(q=2 to nk) as many as nk−1, and sub-sample interval (sx,sy) are read from coding data CD in step S98. In step S99, DC-values, $DC_i$, of subordinate pixel block $B_i$ are added to the linear combination of non-orthogonal base vector $B_q<U_q>$ based on these data to produce decoded subordinate pixel vectors $<T_i>$, which is stored in the corresponding position in frame buffer 15. In this connection, first base vector $<U_1>=<F_1>$ in this occasion is known already in decoding unit 14.

In step S100, 1 is added to register i, and whether i is smaller than 5 or not is judged in step S101. If i is smaller than 5, return to step S92 to perform decoding process similar to the above with respect to next decoded subordinate pixel block $T_i$. Once when i is not smaller than 5, the decoding reproduction process of decoded subordinate pixel blocks $T_1$ to $T_4$, has come to the end and is discontinued.

Next, the efficiencies in coding of the errors in movement-compensated inter-frame expectation by the method of AOT according to the invention and by conventional DCT method, respectively, are compared. FIG. 15 and FIG. 16 illustrate the relation between amount of codes (bit per pixel) and the image quality in PSNR (peak-to-peak signal-to-noise ratio) by AOT (1) and DCT (2), respectively. FIG. 15 shows that for a scenery "garden", and FIG. 16 shows that for a poster picture "mobile", respectively. In this connection, "garden" (Y-component, 720 by 486 pixels, 256 grades) is loaded-down from commonly used video sequences and stills by RPI of http://www.ee.princeton, edu^ykchen/coding.html # SEQ, while "mobile" (G-component, 720 by 486 pixels, 256 grades) is loaded-down from commonly used video sequences and stills by RPI of http://www.ee.princeton,edu^ykchen/coding.html # SEQ, though sample images are not shown.

The condition for the comparative test is determined as:

BPP=(total amount of data [bit])/(pixel number in the original image) $PSNR=20 \log10(255/\sqrt{\epsilon^2})$ [dB]

where $\epsilon^2$ represents mean square error per pixel, total amount of data including the codes of Haffmann table and movement vector. The image data are taken monochrome density image, four continued frames being used. G-components of "mobile" are used as moving image data. Movement-compensated inter-frame expectation is performed in normal direction for each macro-block of 8×8 pixels either in AOT or in DCT. The size of movement vector $<M>=(M_x,M_y)$ is taken to be $-16 \leq M_x, M_y < 15$, and $<M>$ that minimizes the square error is obtained by total search. The two components of movement vector $<M>$ are expected and coded independently from another by Haffmann coding. In addition, data without distortion are used for 0-th frame, thereby the expected error for the first frame is calculated. In quatumizing table for DCT, all components are taken to be 16. Haffmann coding table is optimized for every frame. The basic compression algorithm is in accordance with MPEG-2 [Literature 9].

In FIG. 15 concerning "garden" and in FIG. 16 concerning "mobile", (A), (B) and (C) in each figure corresponds to the results of processing of first, second and third frames, respectively; rigid lines correspond to the results of AOT; broken lines corresponds to the results of DCT; and the node points on the rigid lines correspond to acceptable error Z of 1600, 800, 400, 200 and 100, respectively, starting from the left. From FIGS. 14 and 15, it is observed that a code amount of 1.12 to 1.17 BPP is required for DCT to obtain the image quality accomplished by inter-frame AOT with a code amount of 1.0 BPP. Similarly, it is observed that the code amount in inter-frame AOT is 10 to 25% smaller than that in DCT, for image quality ranging from 35 to 40 dB which is considered to be practical.

When the results of "mobile" and that of "garden" are compared, the improvement in coding efficiency by AOT is more remarkable for natural view "garden" than for "mobile" formed by parallel movement of an object in simple form. It is thought that this is because "garden" involves more complicated objects and movements and, thereby, inter-frame expected error in DCT is larger and more complicated than for "mobile". DCT is orthogonal transformation having highest coding efficiency when the correlation between pixels (image elements) neighboring the object image is significant. Thus. direction dependency is more remarkable for major components on the image plane in DCT and DCT is hardly taken to be a base system suited for compression of localized inter-frame expected errors.

To the contrary, first base in AOT is the most highly correlated pixel (brightness) vector obtained by movement compensation, whereby high-frequency component suited for approximation of expected error is accomplished directly from second base which is orthogonal to the first base. Particularly, second base such that components are concentrated around the periphery of the object is formed easily, whereby reduction in the number of bases used may be expected. It is thought that, owing to the effect, error approximation is made possible with a smaller amount of code than in conventional orthogonal transformation (such as DCT). Therefore, it would be safe to say that AOT in which correlation with the preceding frame is always available can accomplish higher coding efficiency than DCT in which the base vector is defined independently from the data to be coded.

Although the embodiments above are explained with reference to examples of practical values (such as bit number, pixel number, etc.), the invention is, of course, not limited to these exemplary values.

Although an example of movement vector calculation process has been described according to FIG. 5 above, movement vectors can be obtained by various other known methods.

In addition, in the moving image coding apparatus of FIG. 3(A), coding data CD may be outputted after they are subjected further to Haffmann coding. In the moving image decoding apparatus of FIG. 3(B), too, coding data CD may be inputted after they are subjected further to Haffmann decoding.

As described above, moving image data in TV, animation, CG-games and so on can be coded/decoded at a high speed, in high image quality and with a high rate of data compression (coding efficiency), whereby contribution to moving image processing technology is quite significant.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A method for coding a moving image, comprising the steps of:
   comparing a pixel block of current image to be coded and a pixel bock of preceding image within a predetermined region of preceding frame, one after another;
   seeking a specific preceding pixel block minimizing matching error;
   if said matching error relative to said specific preceding pixel block exceeds an acceptable value, obtaining one or more of orthogonal base systems for approximating AC component vector in said pixel block of current image by inter-frame adaptive orthogonal transformation having, as nest thereof, preceding image data within a predetermined region including said specific preceding pixel block; and
   thereby coding said moving image.

2. The method for coding a moving image defined in claim 1, wherein a first base for approximating AC component vector in said pixel block of current image is produced based on an AC component vector of said specific preceding pixel block.

3. The method for coding a moving image defined in claim 2, wherein:
   assuming that said one or more orthogonal base systems for approximating AC component vector of said pixel block of current image is represented by first linear combination:

$$\alpha_1 <V'_1> + \alpha_2 <V'_2> + \ldots + \alpha_{nk} <V'_{nk}>$$

of respective normalized orthogonal bases $<V'_q>$ based on AC component vectors $<U_q>$ of nest pixel block $U_q$, nk in number, including said specific preceding pixel block;
   said first linear combination is transformed to second linear combination:

$$\beta_1 <U_1> + \beta_2 <U_2> + \ldots + \beta_{nk} <U_{nk}>,$$

utilizing AC-component vectors $<U_q>$, the second linear combination being equivalent to said first linear combination, and
   said number of said bases nk, scalar development coefficients $\beta_q$(q=1 to nk), and co-ordinate (x,y) of the nest pixel block as well as sub-sampling intervals (sx,sy) at least related to AC-component vectors $<U_q>$(q=2 to nk) are coded.

4. The method for coding a moving image defined in claim 3, wherein:
   said pixel block of current image itself is coded if said number of bases nk exceeds a predetermined value.

5. The method for coding a moving image defined in claim 1, wherein:
   said pixel block of current image and specific preceding pixel block corresponding thereto are either divided into subordinate pixel blocks of the same dimension; and
   each of said subordinate pixel blocks is subjected to inter-frame adaptive orthogonal transformation.

6. The method for coding moving image defined in claim 1, wherein:
   said pixel block of current image is coded based on movement vector indicating a specific preceding-image pixel block if matching error relative to said specific preceding pixel block does not exceed an acceptable value.

7. An apparatus for coding a moving image, which comprises:
   a first memory storing data of a pixel block of current image;
   a second memory storing data of image in preceding frame containing a pixel block;
   a moving vector-calculating unit for calculating a moving vector indicating a specific pixel block in said preceding frame that minimizes matching error by comparing sequentially said pixel block of current image to be coded and preceding pixel block within a predetermined region of said preceding frame; and
   an inter-frame adaptive orthogonal transformation coding unit for calculating one or more orthogonal base systems for approximating AC-component vector of said pixel block of current image by inter-frame adaptive orthogonal transformation having as nest a preceding image data within a predetermined region including said specific preceding pixel block and coding said orthogonal base systems, if matching error relative to said specific preceding pixel block exceeds an acceptable value.

8. The apparatus for coding a moving image defined in claim 7 wherein:
   said pixel block of current image is coded based on a moving vector indicating the specific ii preceding pixel block, by means of said inter-frame adaptive orthogonal transformation coding unit, if the matching error relative to the specific preceding pixel block does not exceed an acceptable value.

9. The apparatus for coding a moving image defined in claim 7, which further comprises:
   a decoding unit for decoding/storing sequentially said pixel block of current image based on coding output of said inter-frame adaptive orthogonal transformation coding unit and on said image data of preceding frame in said second memory.

10. A recording medium capable of reading out by a computer, wherein a program for executing a process defined in claim 1 in said computer is recorded.

11. The method for coding a moving image defined in claim 2, wherein:
    said current pixel block of current image and specific preceding pixel block corresponding thereto are either divided into subordinate pixel blocks of the same dimension; and
    each of said subordinate pixel blocks is subjected to inter-frame adaptive orthogonal transformation.

12. The method for coding a moving image defined in claim 3, wherein:
    said pixel block of current image and specific preceding pixel block corresponding thereto are either divided into subordinate pixel blocks of the same dimension; and
    each of said subordinate pixel blocks is subjected to inter-frame adaptive orthogonal transformation.

13. The method for coding a moving image defined in claim 4, wherein:
    said pixel block of current image and specific preceding pixel block corresponding thereto are either divided into subordinate pixel blocks of the same dimension; and
    each of said subordinate pixel blocks is subjected to inter-frame adaptive orthogonal transformation.

14. The apparatus for coding a moving image defined in claim 8, which further comprises:

a decoding unit for decoding/storing sequentially said pixel block of current image based on coding output of said inter-frame adaptive orthogonal transformation coding unit and on said image data of preceding frame in said second memory.

15. A recording medium capable of reading out by a computer, wherein a program for executing a process defined in claim 6 in said computer is recorded.

* * * * *